(12) United States Patent
Huang

(10) Patent No.: US 7,748,433 B2
(45) Date of Patent: Jul. 6, 2010

(54) CLIP FOR COLLAPSIBLE AUTO SHADE

(76) Inventor: Sunny E. L. Huang, 786 Via Monte Video St., Claremont, CA (US) 91711

( * ) Notice: Subject to any disclaimer, the term of this patent is extended or adjusted under 35 U.S.C. 154(b) by 1018 days.

(21) Appl. No.: 11/414,960

(22) Filed: May 1, 2006

(65) Prior Publication Data
US 2006/0231220 A1 Oct. 19, 2006

Related U.S. Application Data

(63) Continuation-in-part of application No. 11/026,990, filed on Dec. 30, 2004, which is a continuation of application No. 10/610,848, filed on Jun. 30, 2003, now abandoned, which is a continuation-in-part of application No. 10/118,549, filed on Apr. 8, 2002, now Pat. No. 6,705,381.

(60) Provisional application No. 60/284,976, filed on Apr. 20, 2001.

(51) Int. Cl.
*B60J 3/00* (2006.01)

(52) U.S. Cl. .................. 160/370.21; 296/97.7

(58) Field of Classification Search ............ 160/370.21, 160/370.23, 105, 368.1, DIG. 2, DIG. 3; 296/97.7, 97.8, 97.9; 24/561, 564, 545
See application file for complete search history.

(56) References Cited

U.S. PATENT DOCUMENTS

| | | | | |
|---|---|---|---|---|
| 2,458,125 A * | 1/1949 | Winkler | ..................... | 296/97.2 |
| 3,545,805 A * | 12/1970 | Wilson | ...................... | 296/97.6 |
| 4,167,287 A * | 9/1979 | Franklin et al. | ............ | 296/97.6 |
| 4,944,548 A * | 7/1990 | Payne et al. | ................ | 296/97.8 |
| 5,024,262 A | 6/1991 | Huang | | |
| 5,035,460 A | 7/1991 | Huang | | |
| 5,036,898 A * | 8/1991 | Chen | ......................... | 160/23.1 |
| 5,042,551 A * | 8/1991 | Ein et al. | ...................... | 160/90 |
| 5,116,273 A * | 5/1992 | Chan | ..................... | 160/370.21 |
| 5,553,908 A * | 9/1996 | Shink | ........................ | 296/97.8 |
| 5,664,615 A * | 9/1997 | Baik | ..................... | 160/370.21 |
| 6,224,137 B1 * | 5/2001 | Hunker | ...................... | 296/97.6 |

* cited by examiner

*Primary Examiner*—David Purol
(74) *Attorney, Agent, or Firm*—Paul M. Denk

(57) ABSTRACT

A support assembly for a collapsible automobile shade such as a pleated or folding screen which can be selectively moved between a collapsed position for storage and an open position for placement in a vehicle window. The support assembly consists of one or more arcuate compressible members which extend beyond the perimeter of the pleated or folding screen. Each of the arcuate compressible members is resiliently compressible, for the purpose of conforming to an edge or perimeter of an automobile window in which the shade is installed, while maintaining the screen in an open position, thereby supplying an expansive force to hold the shade in place in the open position. The shade can also be provided with a pocket.

1 Claim, 24 Drawing Sheets

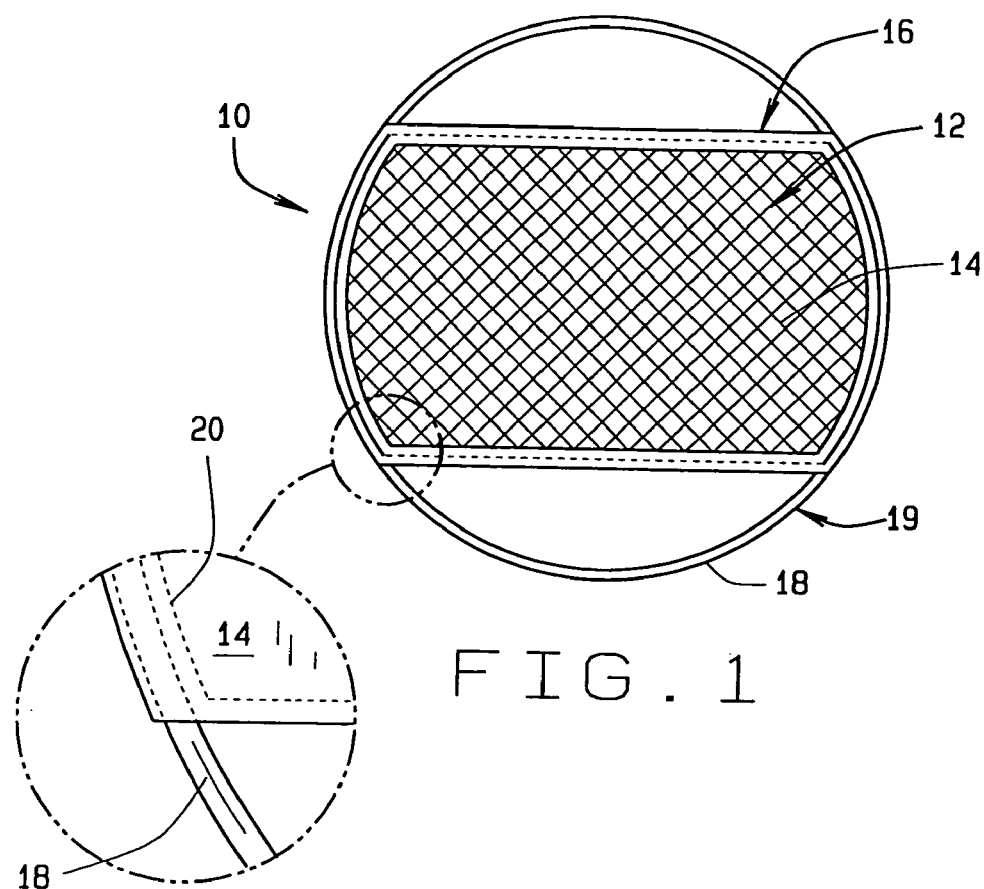
FIG. 1
FIG. 1A
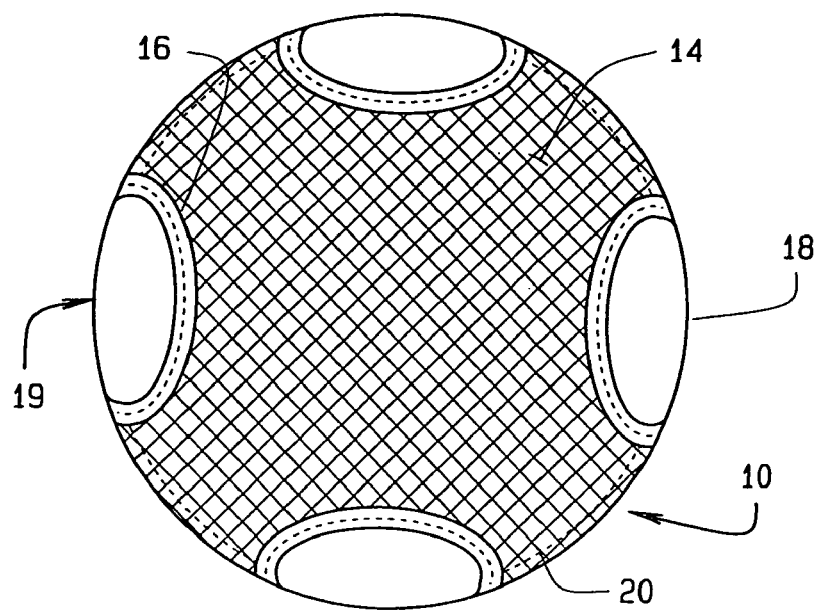
FIG. 2

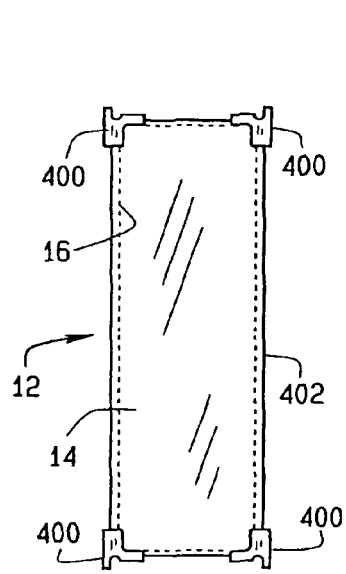
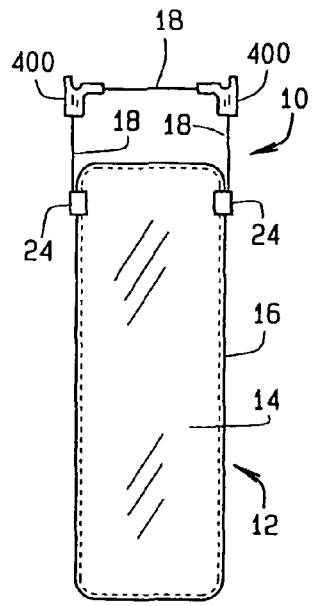
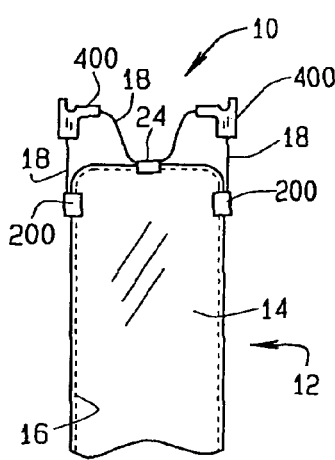
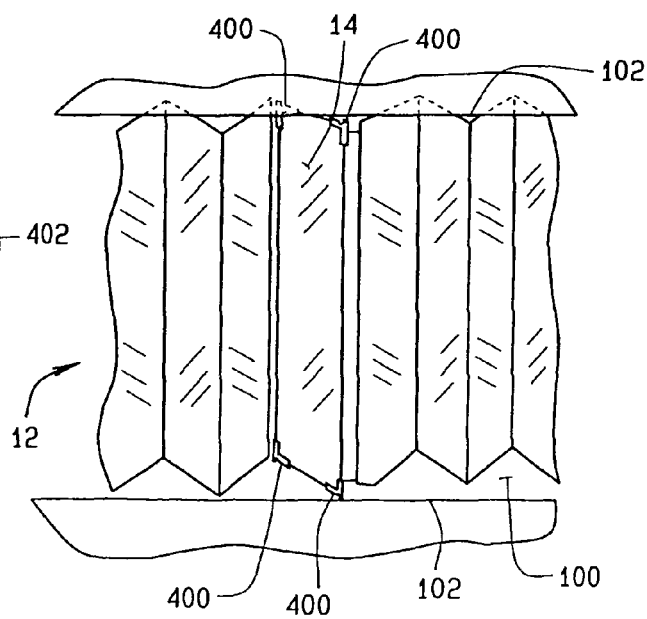
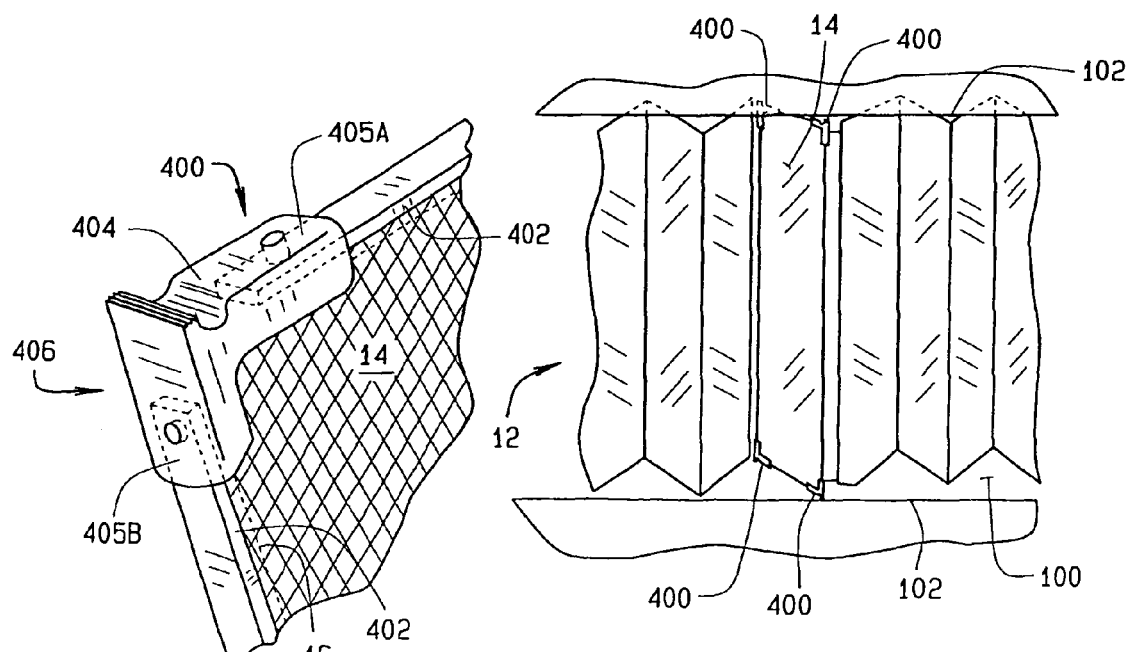

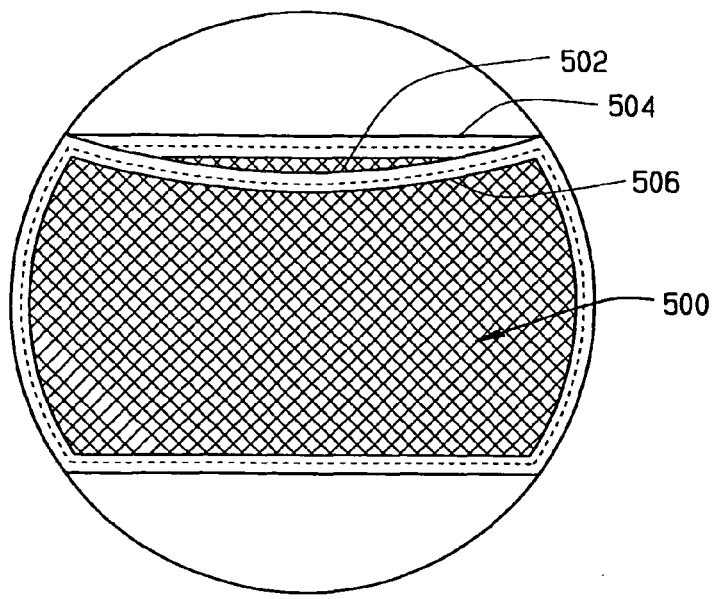
FIG. 22
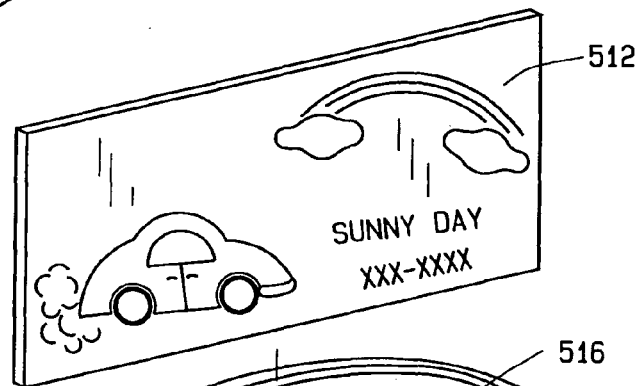
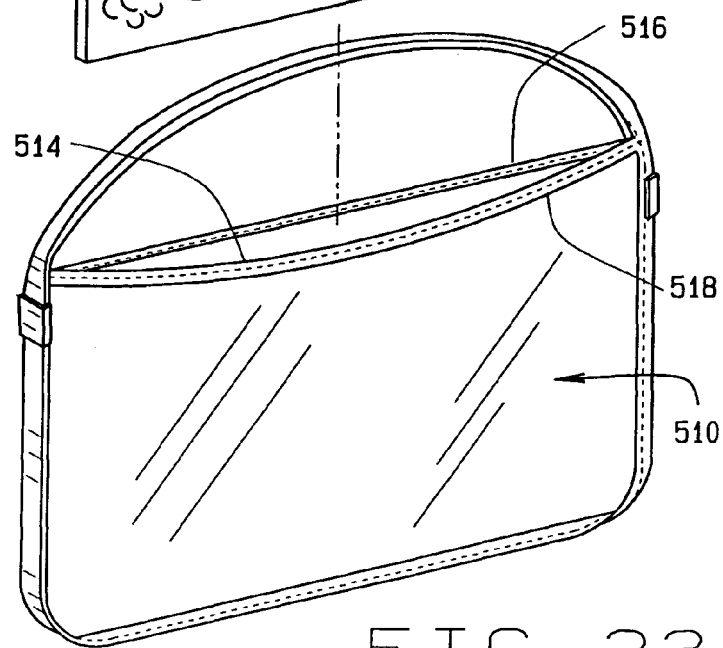
FIG. 23

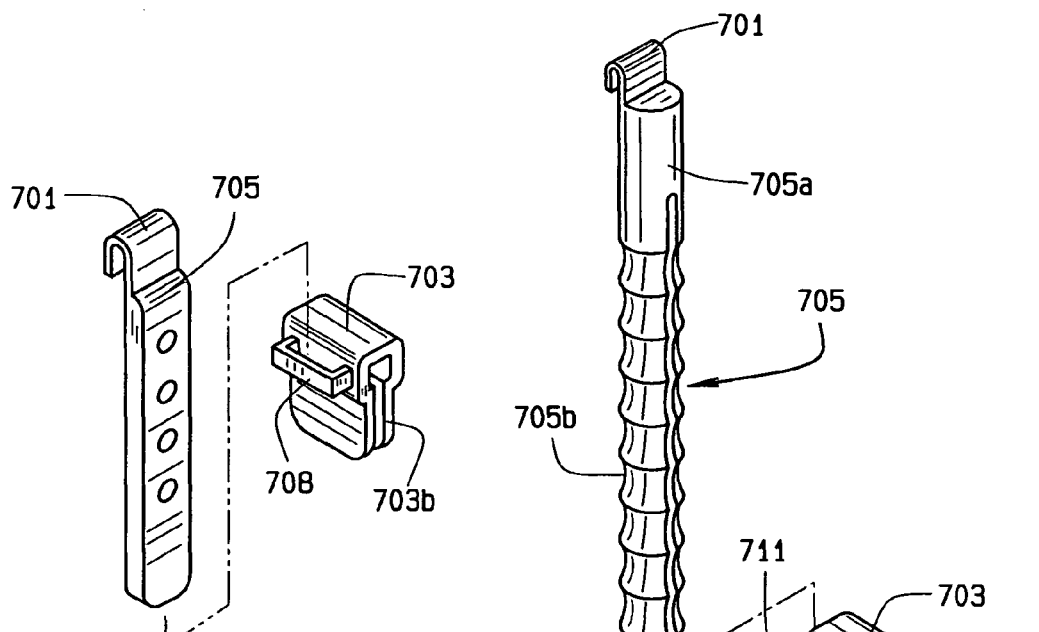
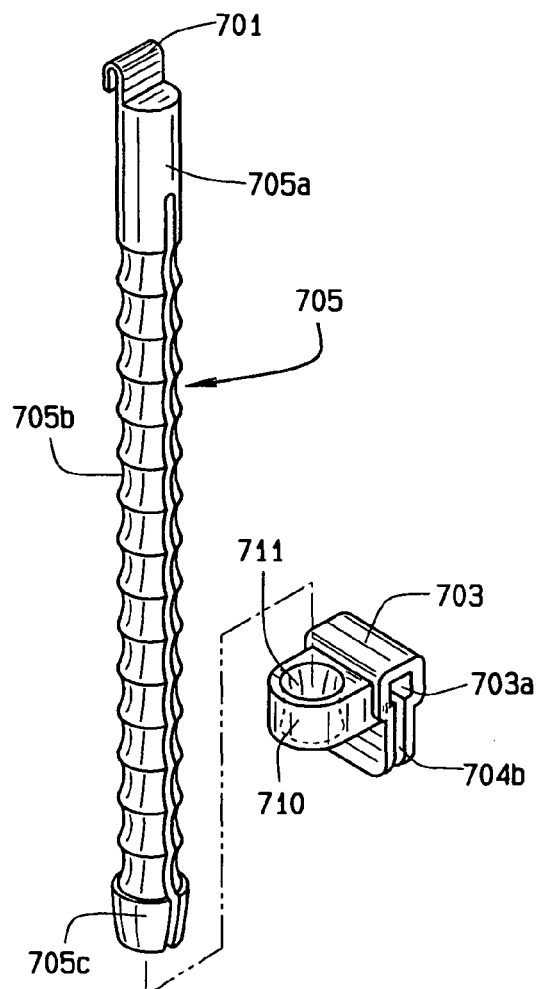
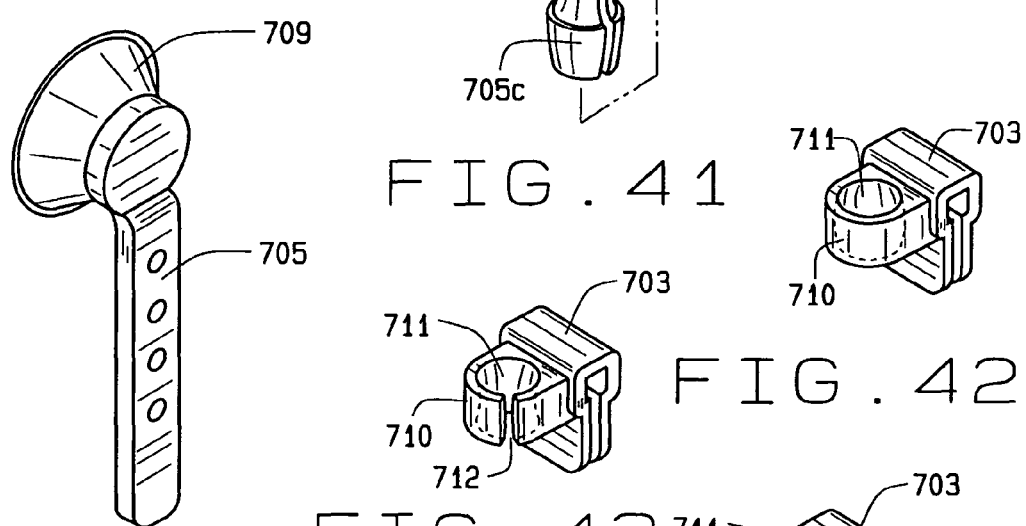
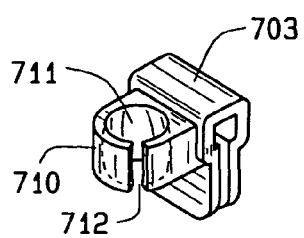
FIG. 39
FIG. 40
FIG. 41
FIG. 42
FIG. 43
FIG. 44

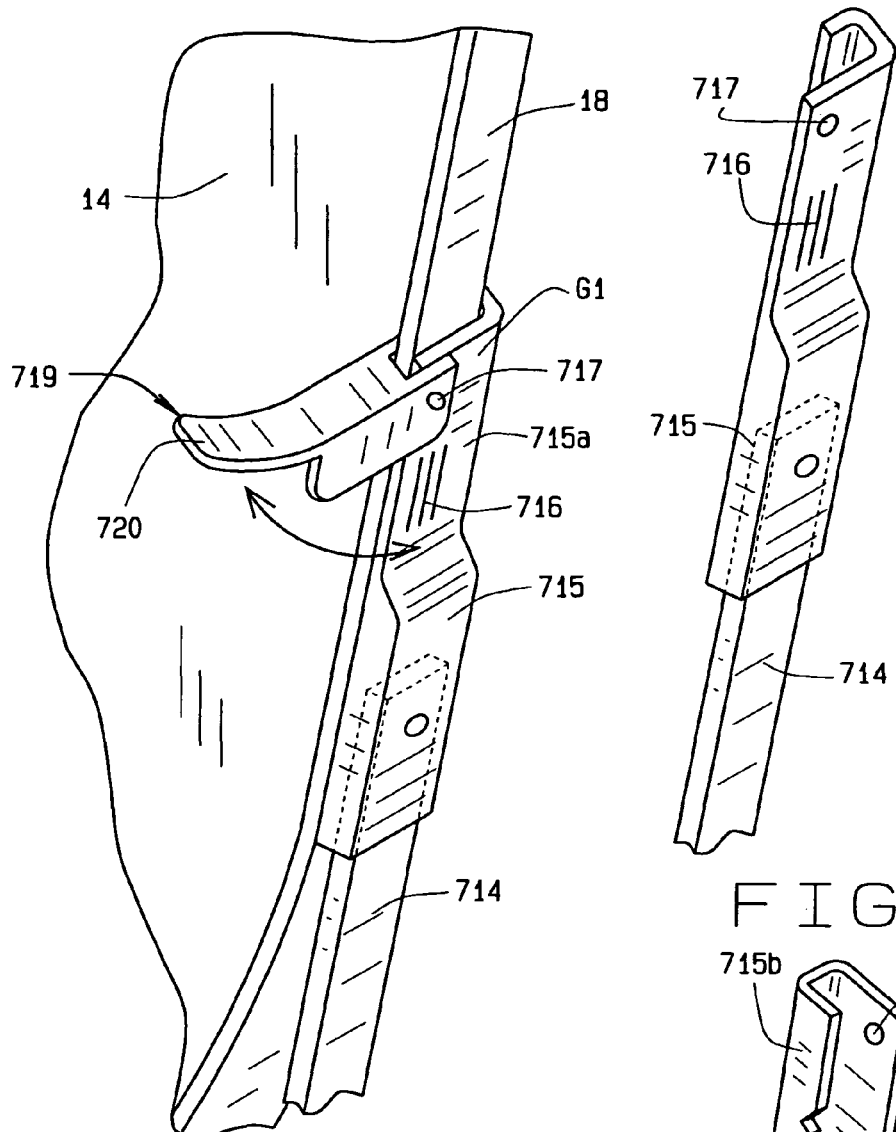
FIG. 52
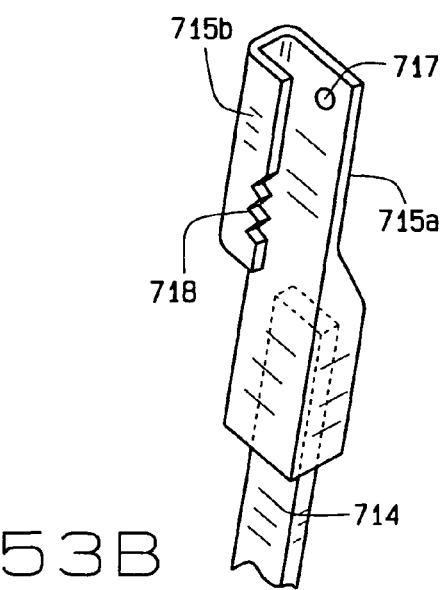
FIG. 53A
FIG. 53B

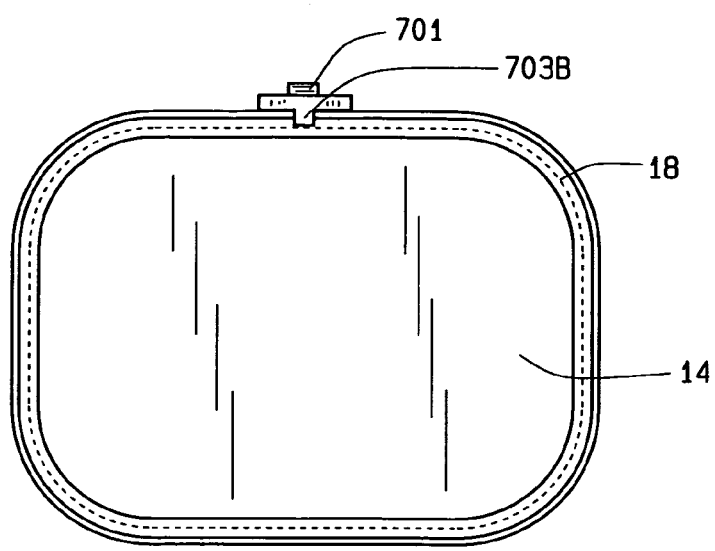
FIG. 55
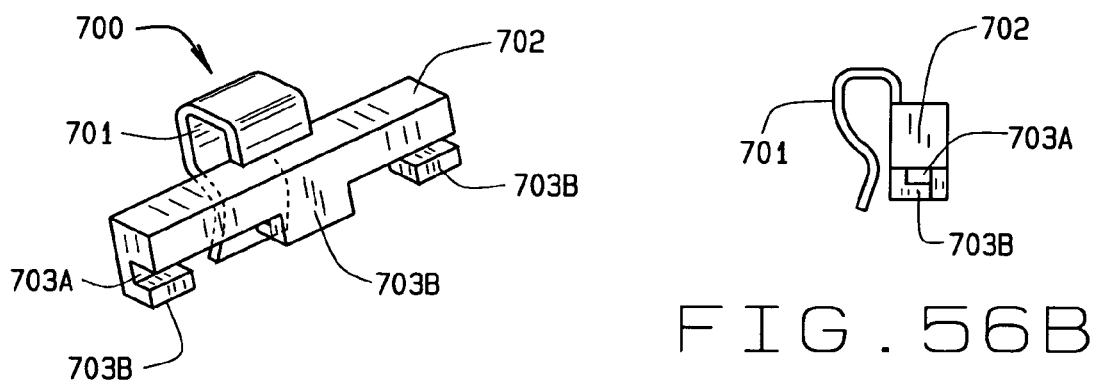
FIG. 56A
FIG. 56B
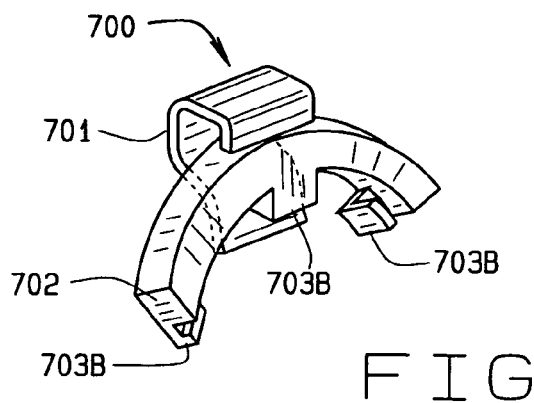
FIG. 57

CLIP FOR COLLAPSIBLE AUTO SHADE

CROSS-REFERENCE TO RELATED APPLICATIONS

This is a continuation-in-part of application Ser. No. 11/026,990 filed Dec. 30, 2004, which is a continuation of application Ser. No. 10/610,848 filed Jun. 30, 2003 now abandoned which is a continuation-in-part of application Ser. No. 10/118,549 (now U.S. Pat. No. 6,705,381) filed Apr. 8, 2002, which claims priority to provisional application Ser. No. 60/284,976, Apr. 20, 2001 which is a continuation-in-part of application Ser. No. 10/307,482 (now abandoned) filed Dec. 2, 2002, which is a continuation-in-part of application Ser. No. 10/116,946 (now U.S. Pat. No. 6,691,762) filed Apr. 8, 2002, which is a continuation-in-part of application Ser. No. 09/766,557 (now U.S. Pat. No. 6,561,257) filed Jan. 19, 2001, which is a continuation of application Ser. No. 09/417,277 (now U.S. Pat. No. 6,192,967) filed Oct. 13, 1999, which claims benefit of provisional application Ser. No. 60/104,703, filed Oct. 19, 1998. All of the above noted applications and patents are incorporated herein by reference.

BACKGROUND OF THE INVENTION

The present invention relates generally to collapsible shades designed to for fitment in a window, such as of an automobile, so as to protect the interior by preventing the entrance of damaging sun rays and the generation of damaging heat, and in particular, to a support structures biasing collapsible or folding windows shades in an automobile window and against adjacent fixtures. Numerous styles of window screens and shades adapted for use in automobiles have long been available in the art. For example, U.S. Pat. No. 5,035,460 for an automobile window protector, and which is incorporated herein by reference, shows the fabrication of such a screen, made of flexible material, and which could be applied to either the interior or exterior of the window of an automobile. In addition, U.S. Pat. No. 5,024,262, and which is incorporated herein by reference, shows a compactly foldable automobile sunshade, which provides for inherent resiliency, at least around its perimeter loop, to hold the shade in an opened configuration, and to provide sunlight protection at the vicinity of the automobile window, but which is capable of significant reduction in size through the folding of the frame into a more compact arrangement for suitable for storage.

During use, an automobile windows shade is typically installed adjacent an automobile window, blocking incoming sunlight or providing interior privacy. However, if the automobile window and the shade do not have exactly the same dimensions, the shade may not function as desired. For example, if the window shade is smaller than the window in which it is installed, it may not stay in place without the aid of fasteners or ties to hold it to the window. Alternatively, if the shade is larger than the window in which it is installed, the shade may bow or wrinkle when fitted into the perimeter of the window, leaving gaps or causing damage to the shade.

Accordingly, there is a need for an automobile window shade support assembly which permits a collapsible or folding automobile window shade to securely fit within a wide variety of automobile windows of varying shapes and sizes which are larger than the shade without bowing, wrinkling, or experiencing damage, and without the need for fasteners or ties.

SUMMARY OF THE INVENTION

Briefly stated, the present invention comprises a support assembly for a collapsible automobile shade material such as a pleated or folding screen which can be selectively moved between a collapsed position for storage and an open position for placement in a vehicle window. The support assembly consists of one or more flexible members which extend beyond the perimeter of the shade material. Each of the flexible members is resiliently compressible, for the purpose of conforming to an edge or perimeter of an automobile window in which the shade is installed, while maintaining the screen in an open position, supplying an expansive force to hold the shade material in place in the open position.

In a second embodiment, each of the flexible members comprising the support assembly is adjustable to alter the extension of each of the flexible members beyond the perimeter of the shade material. A slide clasp is configured to permit each flexible member to slide along the perimeter of the shade, between a fully extended position having maximum displacement from the perimeter of the shade material, and a retracted position adjacent the perimeter of the shade material. Each flexible member is configured to adjust as required to facilitate the installation of the shade in automobile windows of varying shapes and sizes.

In a third embodiment, the support assembly includes one or more rigid mounting elements spaced about the perimeter of the collapsible automobile shade. Each rigid mounting element is configured to grip or seat on an edge or perimeter of an automobile window in which the shade is installed, supplying a holding force to secure the shade in place in the open position.

In a fourth embodiment, the support assembly for a rectangular collapsible automobile shade includes one or more flexible members which extend beyond the perimeter of the shade material in combination with one or more rigid mounting elements. The rigid mounting elements are disposed at the corners of the collapsible shade, and are interconnected by the flexible members, which provide an expansive force to seat the rigid mounting elements against the edge or perimeter of an automobile window in which the shade is installed in an open position.

The compressible members can be formed from either one section or two sections of metal bands. If formed from two sections, then the two metal bands can be joined together by appropriate means, such as a clamp.

The material from which the screens of the shades are made can be stretchable. Preferably, the screen material is stretchable in two opposed directions. The foregoing and other objects, features, and advantages of the invention as well as presently preferred embodiments thereof will become more apparent from the reading of the following description in connection with the accompanying drawings.

BRIEF DESCRIPTION OF THE DRAWINGS

In the accompanying drawings which form part of the specification:

FIG. 1 is front view of one embodiment of the collapsible automobile shade of the present invention, illustrating a circular support assembly integrated with a generally rectangular screen;

FIG. 1A is an enlarged view of the mounting of the screen to the frame of the shade.

FIG. 2 is front view of one embodiment of the collapsible automobile shade of the present invention, illustrating a circular support assembly integrated with a generally square screen;

FIG. 17 is a perspective view of a rigid mounting element utilizes to secure an automobile shade to a vehicle window perimeter;

FIG. 18 is a front view of one embodiment of a collapsible automobile shade of the present invention with a plurality of rigid mounting elements of FIG. 17;

FIG. 19 is a front view of one embodiment of a collapsible automobile shade of the present invention with a pair of rigid mounting elements of FIG. 17 disposed on a flexible support member of FIG. 3;

FIG. 20 is a front view of one embodiment of a collapsible automobile shade of the present invention with a pair of rigid mounting elements of FIG. 17 disposed on a flexible support member of FIG. 4;

FIG. 21 is a front view of one embodiment of a folding automobile shade of the present invention with a pair of rigid mounting elements of FIG. 17 disposed on either end of an expanding support shaft;

FIG. 22 is a perspective view of an alternative shade, similar to the shade of FIG. 1, but provided with a pocket;

FIG. 23 is a perspective view of an alternative shade, similar to the shade of FIG. 3, but provided with a pocket and showing that a sign can be placed in the pocket;

FIG. 39 shows an alternate embodiment of a clip with a band through which a stem passes which allows adjusting a window shade's elevation upon a window;

FIG. 40 shows an alternate embodiment of the clip and stem where the stem connects to a clip in the form of a suction cup;

FIG. 41 shows an alternate embodiment of the clip and the stem that permits adjusting the window shade relative to the top edge of the window glass;

FIGS. 42 through 44 describe alternate embodiments of the clip introduced in FIG. 41;

FIG. 52 shows an alternate embodiment of the clip connecting the resilient member to the compressible member;

FIGS. 53A, 53B, 53C, and 53D show side views of the components of the alternate embodiment of the clip;

FIG. 55 shows a window shade with a clip slideably engaged upon the resilient member;

FIG. 56A is an isometric view of a clip that slideably grasps a resilient member, FIG. 56B is a side view of the clip;

FIG. 57 is an isometric view of an alternate embodiment of the clip for slideable engagement;

Corresponding reference numerals indicate corresponding parts throughout the several figures of the drawings.

DESCRIPTION OF THE PREFERRED EMBODIMENT

Figure 3:
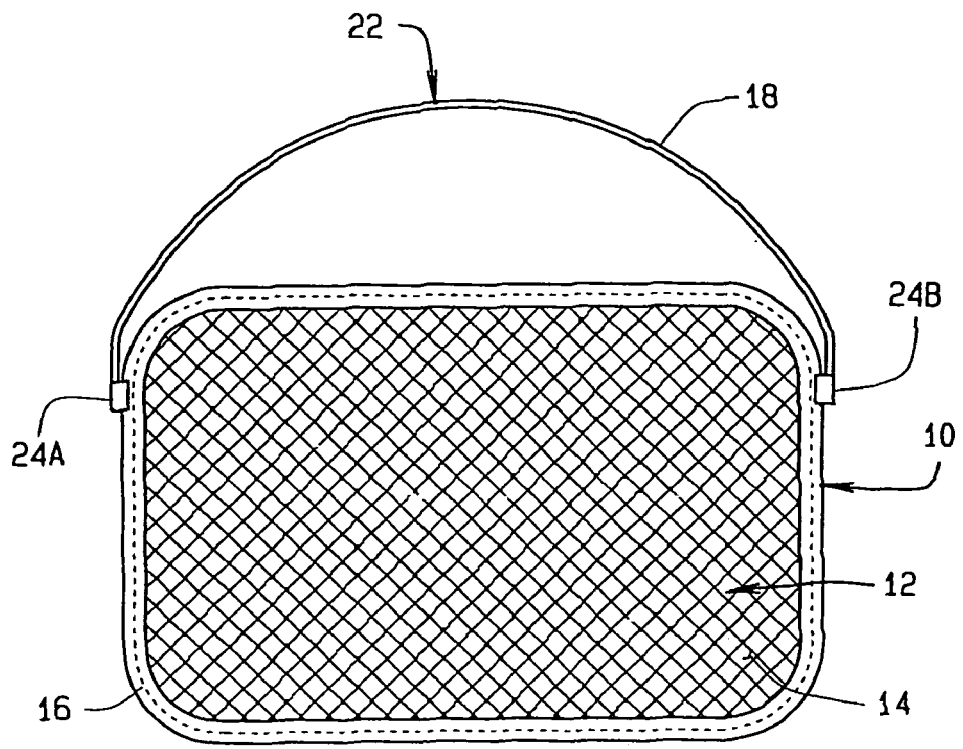
FIG. 3 is a front view of one embodiment of the collapsible automobile shade if the present invention, illustrating a flexible member support assembly disposed adjacent one edge of a rectangular screen.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In referring to the drawings, and in particular to FIG. 1, one embodiment of the support structure 10 associated with a collapsible automobile shade 12 is disclosed. The collapsible automobile shade 12 includes a shaped screen 14 of fabric-like material which may be cloth, mesh, polymer, or even Mylar. Preferably, the material easily deforms into any shape without a memory. When the automobile shade 12 is expanded, as shown in FIG. 1, the shaped screen 14 is held in an open configuration, in this particular instance being generally rectangular, and which can be used as a sun shade or privacy screen, internally of an automobile windshield or window. The outer edge 16 of the shaped screen 14 defines a perimeter boundary or border, which in this illustrative embodiment is made from simply rolling the outer edge back on itself and securing the edge by sewing.

It will be recognized by those of ordinary skill in the art that the particular shape for the shaped screen 14 may undertake various configurations, and such shapes may include the rectangular form as shown in FIG. 1, a square form as shown in FIG. 2, an oval, circular, or truncated configuration, depending upon the particular automobile make and model for which the screen is intended for use.

As seen in the embodiments of FIGS. 1 and 2, the support structure 10 comprises a spring-like compressible member 18 extending beyond a portion of the outer edge 16 of the shaped screen 14. The compressible member 18 is a single continuous length of spring-like or resiliently compressible material, such as a thin metal band having an inherent shape memory, forming a circular framework 19 for supporting the shaped screen 14 in an open configuration. The spring-like or resilient nature of the compressible member 18 permits the collapsible automobile shade 12 to be reversibly twisted in upon itself in a conventional manner, into a compact and overlapping collapsed configuration suitable for storage. Preferably, the compressible member 18 and the shaped screen 14 are coupled by incorporating the compressible member 18 into the outer edge 16 or border of the shaped screen 14.

Figure 4:
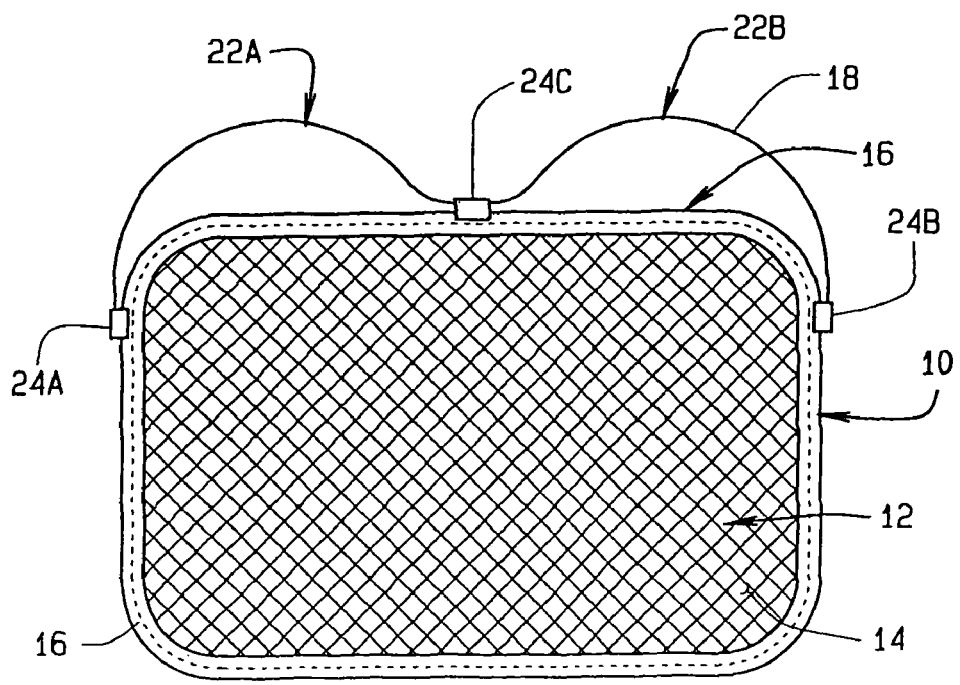
FIG. 4 illustrates the flexible support member of FIG. 3 secured to the edge of the rectangular screen, defining a pair of compressible bulges.

In a third embodiment, shown in FIG. 3, a single compressible member 18 forms an arcuate framework 22 for supporting the shaped screen 14 in an open configuration. The arcuate framework 22 is secured to the perimeter boundary of the shaped screen 14 in a conventional manner at two fixed attachment points 24A, 24B, such as by crimping or clamping. Alternatively, as shown by a variation of the third embodiment in FIG. 4, the arcuate framework 22 may include a centrally disposed third fixed attachment point 24C, forming a pair of arcuate elements 22A, 22B adjacent one edge of the shaped screen 14 from the single compressible member 18.

Figure 5:
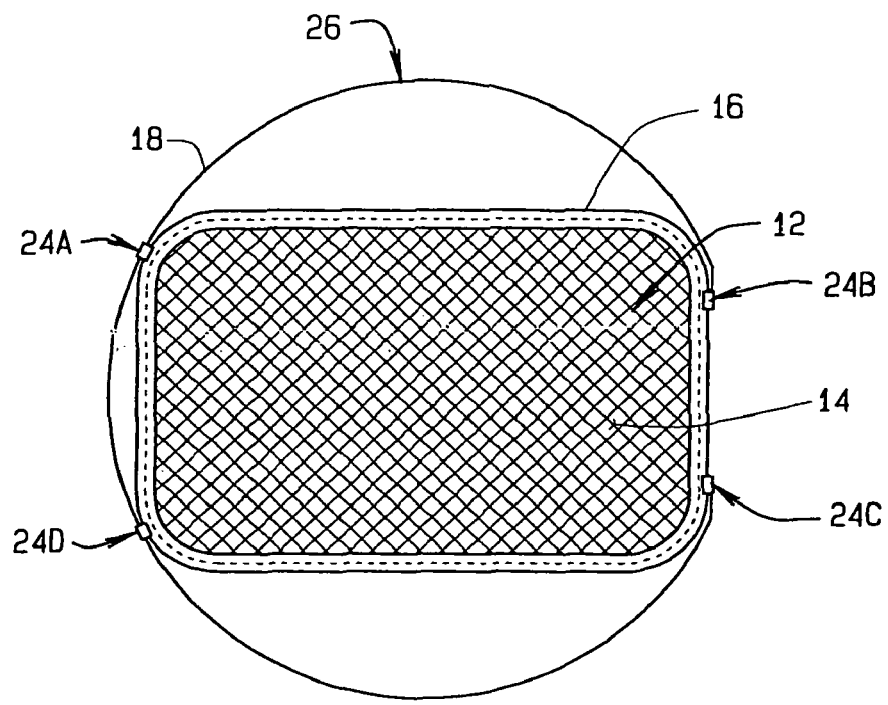
FIG. 5 is front view of one embodiment of the collapsible automobile shade of the present invention, illustrating a circular support assembly secured to a generally rectangular screen.

In a fourth embodiment shown in FIG. 5, a single compressible member 18 is disposed in a circular configuration 26 about the outer edge 16 of the shaped screen 14, in an open configuration. Unlike the embodiment shown in FIG. 1, the shaped screen 14 in this embodiment is secured to the compressible member 18 by a plurality of fixed attachment points 24A, 24B, 24C, and 24D in spaced relationship about the perimeter boundary of the shaped screen 14.

Figure 6:
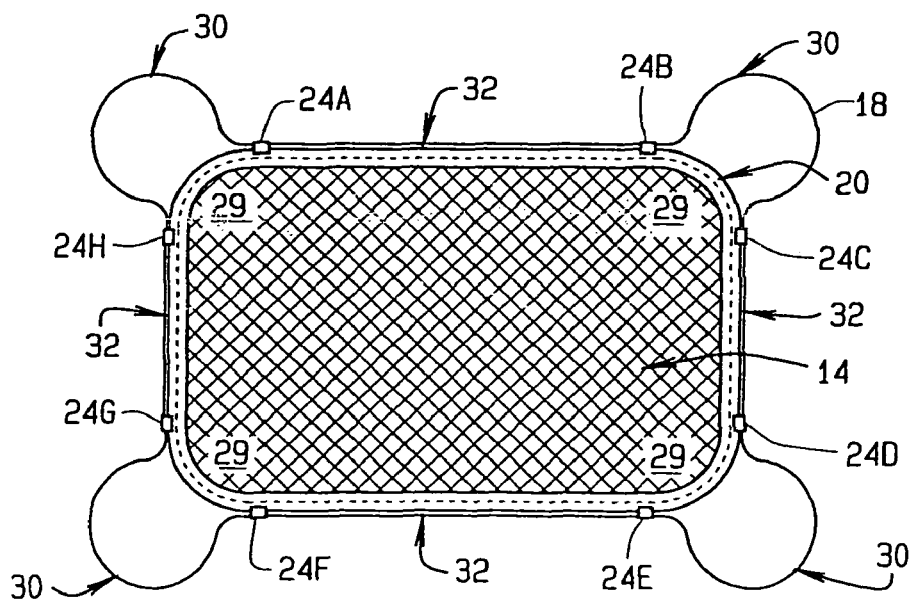
FIG. 6 is a front view of one embodiment of the collapsible automobile shade of the present invention, illustrating a support assembly consisting of a plurality of flexible members secured adjacent to the corners of a generally rectangular screen.

In a fifth embodiment shown in FIG. 6, a single compressible member 18 is disposed about the outer edge 16 of the shaped screen 14 in an open configuration. The compressible member 18 is secured to the outer edge 16 of the shaped screen 14 by a plurality of fixed attachment points 24A-24H, such that portions 30 of the compressible member 18 adjacent corner regions 29 of the shaped screen 14 are spaced apart there from and, as shown, for segments of circles, while portions 32 of the compressible member 18 adjacent the elongated sides of the shaped screen 14 are substantially parallel there to.

Figure 7:
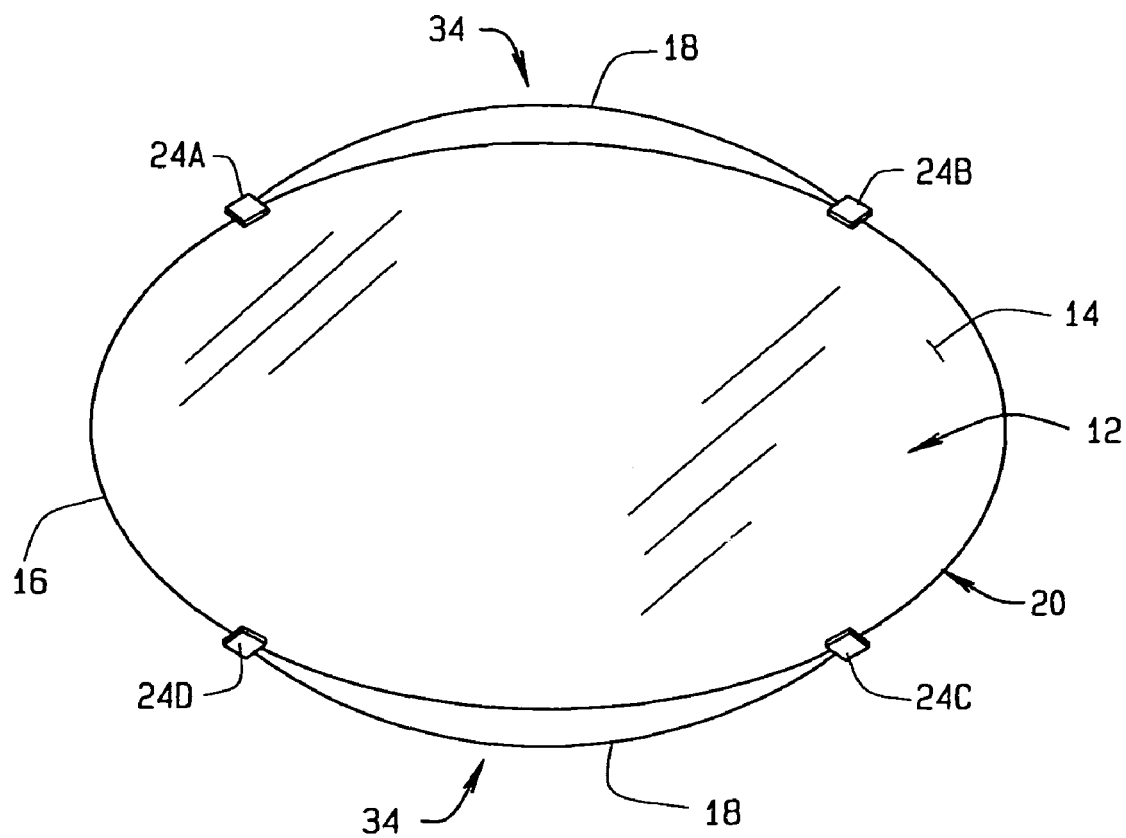
FIG. 7 is a perspective view of one embodiment of the collapsible automobile shade of the present invention, illustrating a support assembly consisting of a plurality of opposing flexible members secured to the perimeter of a circular screen.

In a sixth embodiment shown in FIG. 7, a pair of compressible members 18 are disposed in spaced relationship about the outer edge 16 of the shaped screen 14 in an open circular configuration. Each compressible member 18 forms an arcuate framework 34 spaced apart from the outer edge 16 for supporting the shaped screen 14 in an open configuration. Each arcuate framework 34 is secured to the perimeter boundary of the shaped screen 14 at two fixed attachment points 24A, 24B and 24C, 24D, respectively.

Figure 8:
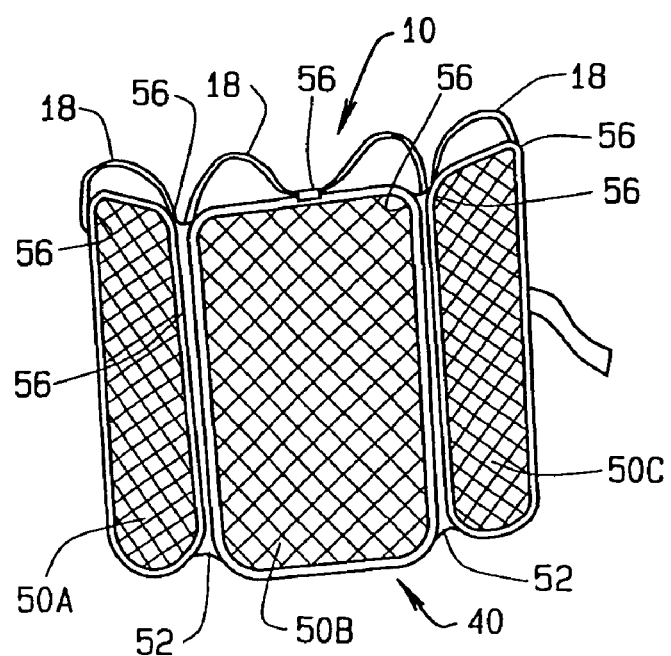
FIG. 8 is a perspective view of a three-piece folding automobile shade, with each piece including the flexible support member of FIG. 3.

In a seventh embodiment shown in FIG. 8, the support structure 10 is adapted for use with a conventional folding automobile shade 40 comprising a number of rigid shade panels 50A, 50B, and 50C. The shade 40 is configured to fold in a conventional manner along seams 52 disposed between each shade panel 50A, 50B, and 50C, from an open configuration to a closed configuration. The adapted support structure 10 includes a compressible member 18 associated with each rigid shade panel 50A, 50B, and 50C. Each compressible member 18 forms an arcuate framework 54 for supporting the associated rigid shade panel 50A, 50B, and 50C in an open configuration, and is secured to an outer edge of the associated rigid shade panel at two or more fixed attachment points 56.

Figure 9:
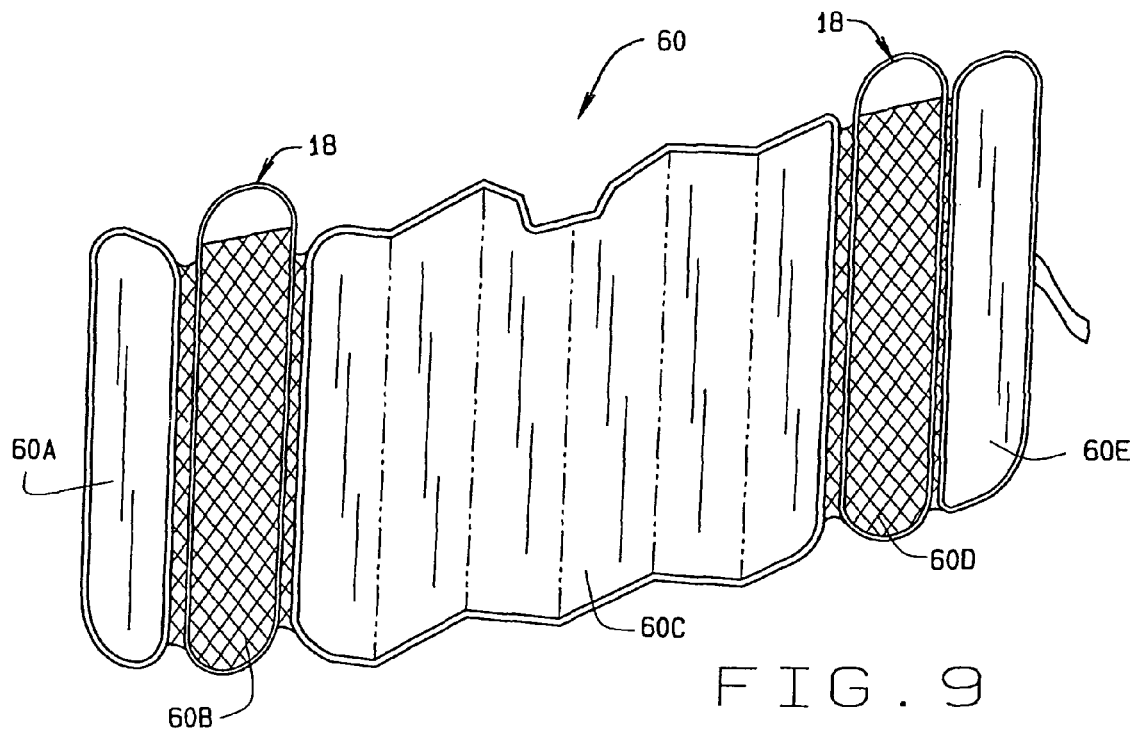
FIG. 9 is a perspective view of a multi-piece folding automobile shade, with a pair of pieces including the flexible support member of FIG. 3.

In a variation on the seventh embodiment, shown in FIG. 9, only a limited number of the individual rigid shade panels 60A-60E comprising a conventional folding automobile shade 60 are provided with associated compressible members 18 of the support structure 10.

Figure 10:
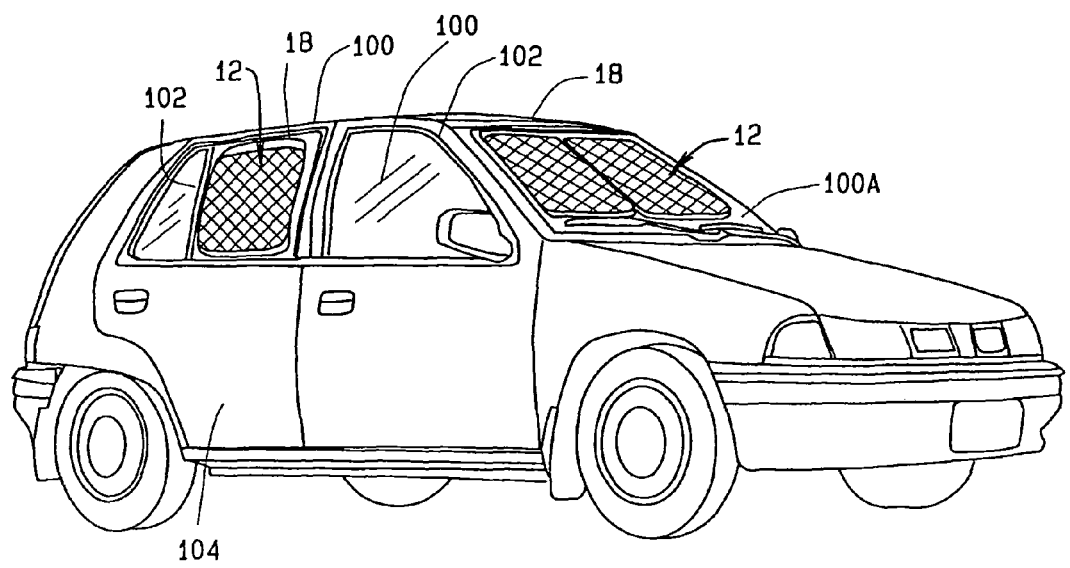
FIG. 10 is a perspective view of an automobile with various embodiments of the collapsible automobile shades installed in the front and side windows.
Figure 11:
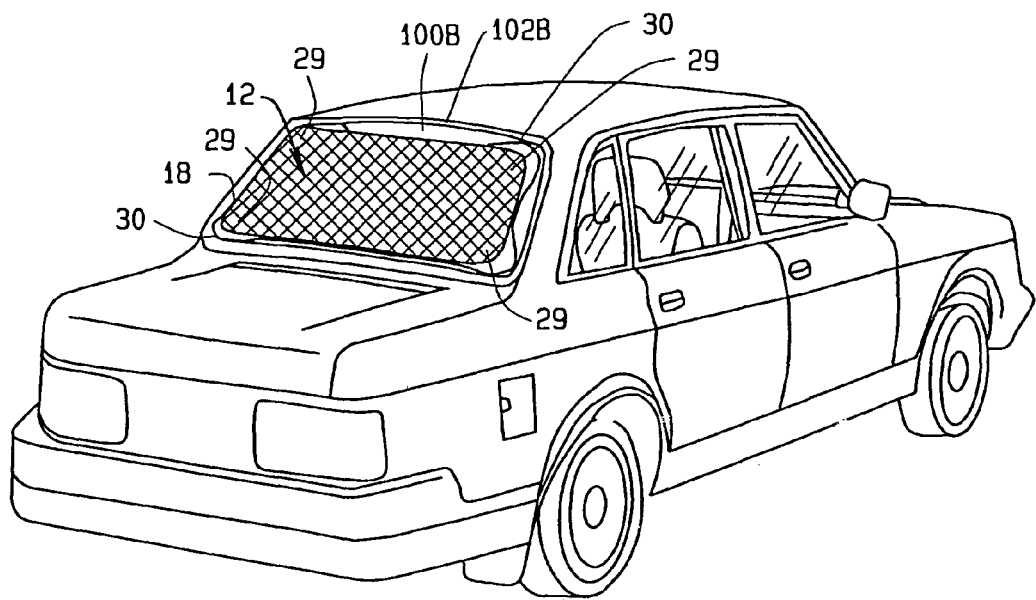
FIG. 11 is a perspective view of an automobile with the embodiment of the collapsible automobile shade of FIG. 6 installed in the rear window.

FIGS. 10 and 11 illustrate the use and operation of the support structure 10 of the present invention to secure a collapsible automobile shade 12 in an automobile window 100. A collapsible automobile shade 12 is initially unfolded or expanded to a fully open configuration such as shown in FIGS. 1-9. Preferably, the shade 12 is selected to include a shaped screen 14 having overall dimensions equal to or smaller than those of the frame 102 of the automobile window 100 in which it is to be installed, and to include a compressible member 18 such that the combined maximum dimensions of the support structure 10 and the shaped screen 14 are greater than at least one corresponding dimension of the automobile window 100. For example, it is preferable that for an automobile window having a 20.0 inch height dimension, a collapsible automobile shade 12 be selected to have a height of the shaped screen 14, combined with that of the compressible member 18, which exceed 20.0 inches.

When installed against the automobile window 100, the components of the support structure 10 are reversibly deformed and compressed to fit within the frame 102, providing tensioned support for the shaped screen 14 by transferring the compressive loads to the outer edge 16 of the shaped screen 14. For example, turning to FIG. 10, an embodiment of the present invention shown in FIG. 1 is shown installed in the automobile window 100 of a rear door 104. A pair of similar automobile shades 12 is seen installed in the windshield 100A. The compressible member 18, initially defining a circular framework 19 within which the shaped screen 14 is held, is deformed and compressed by the frame 102 into a substantially rectangular configuration, reducing the spacing between the shaped screen 14 and the compressible member 18 above and below the shaped screen 14. The inherent shape memory of the spring-like compressible member 18 resists compression by the window frame 102, exerting an outwardly directed holding force against the window frame 102, maintaining the automobile shade 12 in position against the window 100.

Each embodiment of the support structure 10 shown in FIGS. 1-9 is utilized in a similar manner to that described above. As shown in FIG. 11, the embodiment of the present invention shown in FIG. 6 is illustrated in use to secure an automobile shade 12 in an open configuration against a rear window 100B of an automobile. Specifically, each of the portions 30 of the compressible member 18 adjacent corner regions 29 of the shaped screen 14 is compressed against the corresponding corners of the rear window frame 102B, providing a tensioning support to maintain the automobile shade 12 in place against the rear window 100B.

Figures 12, 13:
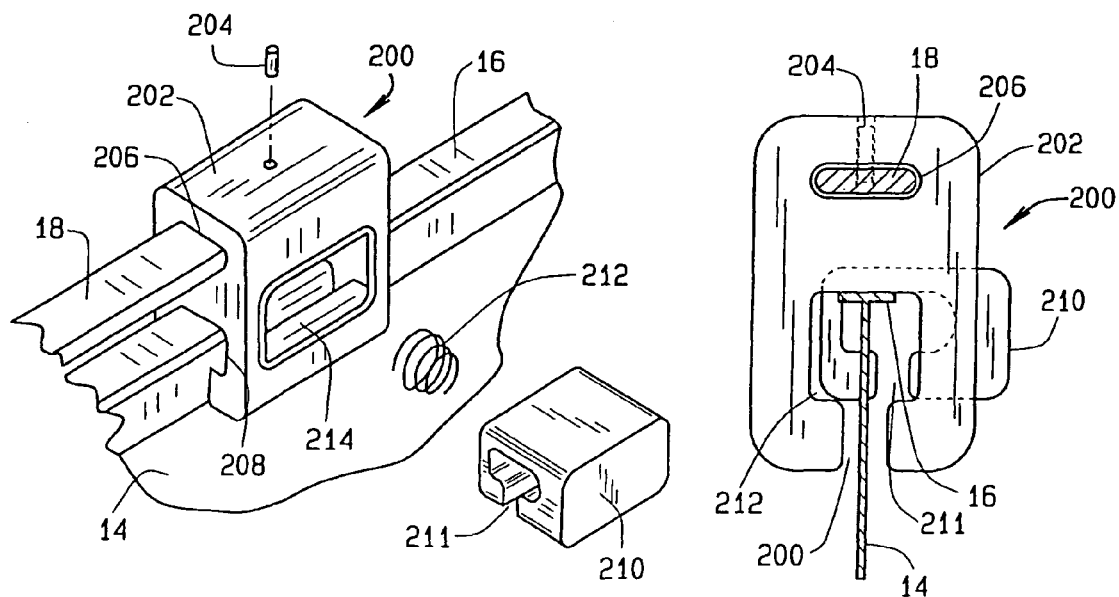
FIG. 12 is an exploded perspective view of a sliding clamp assembly utilized to secure a flexible support member of the present invention to an automobile shade perimeter.
FIG. 13 is a sectional view of the sliding clamp assembly of FIG. 12.

For some applications of the support structure 10, it is desirable to alter the spacing between the compressible members 18 and the shade material 14, so as to permit an automobile shade 12 including the support structure 10 to be utilized in automobile windows 100 having a wide range of dimensions. Turning to FIGS. 12 and 13, an alternate embodiment of the support structure 10 is shown to include a slide coupler 200 utilized in place of a fixed attachment point to secure the compressible member 18 to the outer edge 16 of the shade material 14. The slide coupler 200 consists of a coupler body 202 which is secured to one end of the compressible member 18, preferably by a locking dowel 204 or other conventional attachment means passing through the compressible member 18 seated in a recess 206, and engaging the coupler body 202. The coupler body 202 further includes a channel 208 into which the outer edge 16 of the automobile shade 12 is seated. A release button 210, biased by a spring 212 is seated in a bore 214 intersecting the channel 208. The release button 210 includes a second channel 211 aligned parallel with the channel 208, and is biased by spring 212 to exert a locking pressure against the outer edge 16, securing the slide coupler 200 against sliding movement relative to the outer edge 16. When in the biased (locking) position, a portion of the release button 210 protrudes from the bore 214, beyond the face of coupler body 202.

When depressed inward towards the coupler body 202, the release button 210 compresses the spring 212, and shifts the second channel 211 into longitudinal alignment with the channel 208. When channel 208 and the second channel 211 are in longitudinal alignment, the slide coupler 200 is capable of sliding movement along the outer edge 16. When released, the release button 210 is biased outward from the coupler body 202 by the spring 212, moving the second channel 211 into parallel alignment with the channel 208, and trapping a portion of the outer edge 16 there between. The trapped portion of the outer edge 16 resists sliding movement by the slide coupler 200, securing the compressible member 18 in a fixed location relative thereto.

Using the slide coupler 200 it is possible to alter the spacing between the compressible members 18 and the shade material 14, so as to permit an automobile shade 12 including the support structure 10 to be utilized in automobile windows 100 having a wide range of dimensions. Specifically, by sliding the slide coupler 200, and accordingly, the compressible member 18 along the outer edge 16 of the automobile shade 12, the displacement of portions of the compressible member 18 from the outer edge 16 will either increase or decrease, permitting use of the automobile shade and support structure 10 in either larger or smaller windows.

Figure 14:
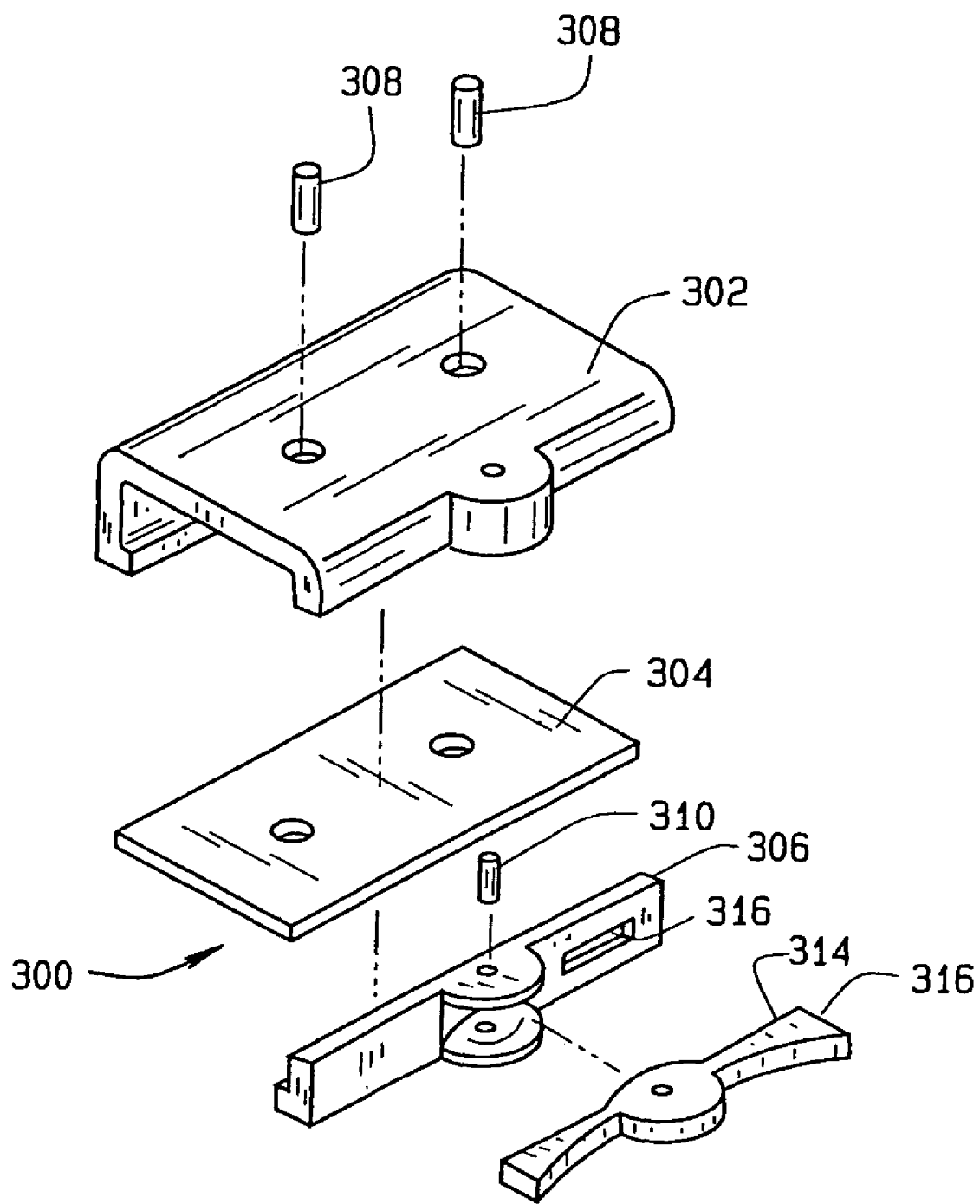
FIG. 14 is an exploded perspective view of an alternate embodiment sliding clamp assembly.
Figure 15:
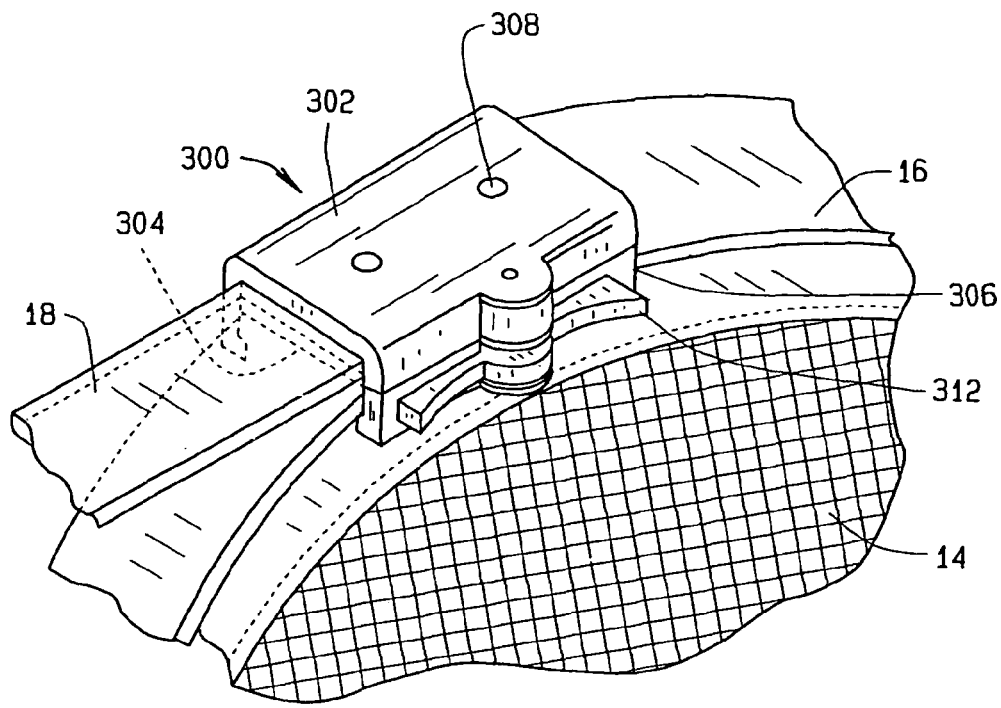
FIG. 15 is a perspective of the alternate embodiment sliding clamp assembly of FIG. 14.

Turning to FIGS. 14 and 15, a first alternate embodiment of the slide coupler suitable for use on an automobile shade 12 having a rigid outer edge 16 is shown. The slide coupler 300 includes an upper clamp plate 302, a lower clamp plate 304, and a face plate 306. One end of a compressible member 18 is secured between the upper clamp plate 302 and the lower clamp plate 304 by a pair of locking dowels 308 passing through aligned bores in the clamp plates and the compressible member 18. The face plate 306 is bonded to an edge of the upper clamp plate 302, and provides a pivot 310 for a cam lever 312. The cam lever 312 includes a cam surface 314 in alignment with an opening 316 in the face plate 306.

As best seen in FIG. 15, when installed as part of a support structure 10, the slide coupler 300 is secured to a rigid outer edge 16 of an automobile shade by the lower retaining lip 318 on the upper clamp plate 302 and the face plate 306. The rigid outer edge 16 is further aligned with the opening 316 in the face plate 306, such that the cam surface 314 is engaged thereto. Depressing the cam lever 312 rotates the cam surface 314 about the pivot 310, away from the outer edge 16, permitting the slide coupler 300 and attached compressible member 18 to slide along the outer edge 16. When a desired position is reached, the cam lever 312 is released, and the cam surface 314 again engages the outer edge 16 through the opening 316, securing the slide coupler 300 in a fixed position relative to the outer edge 16.

Figure 16:
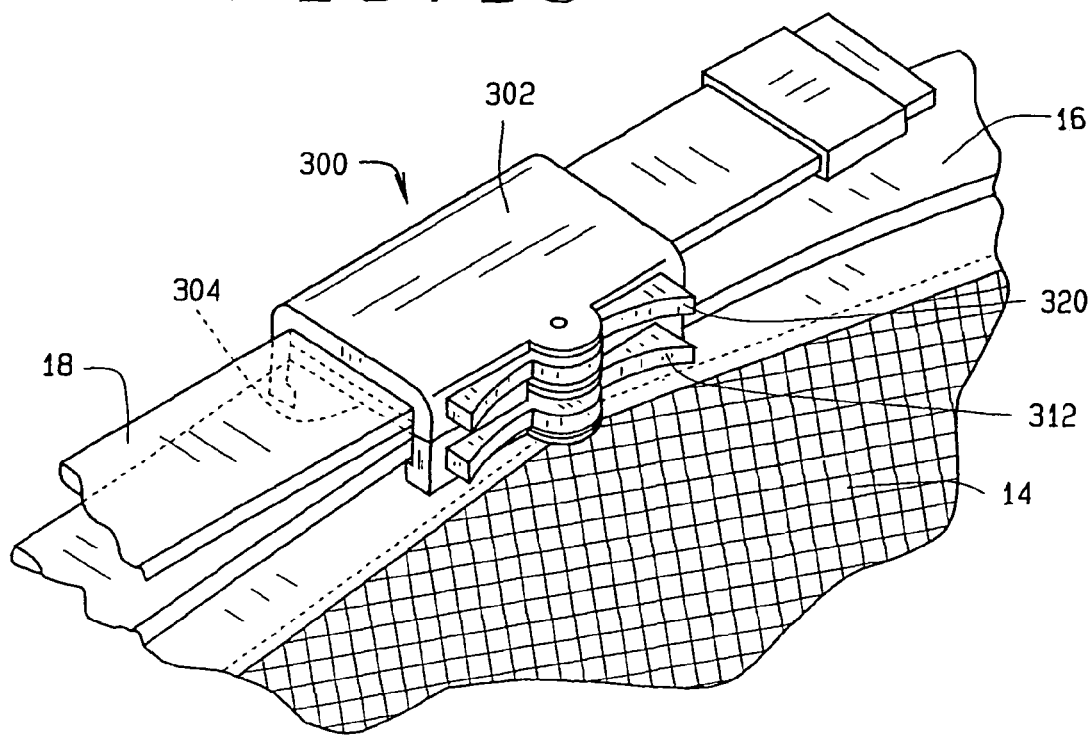
FIG. 16 is a perspective view of another alternate embodiment sliding clamp assembly.

Turning to FIG. 16, a variation of the slide coupler 300 is shown to include a second cam lever 320 in place of the locking dowels 308. The second cam lever 320 operates identically to the cam lever 312, but instead engages an edge of the compressible member 18 through a correspondingly positioned opening. Absent the engagement of the second cam lever 312, the compressible member 18 is free to slide through the slide coupler 300. When engaged by the second cam lever 312, the compressible member 18 is fixed in place relative to the slide coupler 300. By providing a pair of cam levers 312, 320, the slide coupler location may be moved about the outer edge 16 of the automobile shade 12, and the length of the compressible member 18 may be adjusted by controlled movement through the slide coupler 300.

To facilitate holding an automobile shade 12 in a vehicle window, one or more rigid mounting elements 400, such as shown in FIG. 17 through FIG. 21 may be utilized. Preferably, a plurality of rigid mounting elements 400 are disposed in a spaced relationship about the perimeter of the automobile shade 12, at each corner of the shade material 14 or support structure 10. Each rigid mounting element 400 is secured to either a framework 402 incorporated into the outer edge 16 of the shade material 14, or to elements of the support structure 10, such as a compressible member 18. Preferably, each rigid mounting element 400 includes an L-shaped body 404 defining a pair of extensions 405A, 405B, and having a friction surface 406 disposed at the apex. Each extension 405A and 405B is configured to receive either a portion of the framework 402 as shown in FIGS. 17, 18, and 21, or elements of the support structure 10 as shown in FIGS. 19 and 20, in a fixed relationship.

During use, when the automobile shade 12 is in an open configuration such as shown in FIG. 21, and placed in a window 100 of an automobile, the friction surface 406 on each rigid mounting element 400 seats against the framework 102 surrounding the window 100, to provide a positive contact against which the automobile shade 12 and/or support structure 10 can exert a holding force to maintain the automobile shade 12 in place adjacent the window 100.

An alternative shade 500 is shown in FIG. 22. The shade 500 is similar to the shade 10 of FIG. 3, but which is provided with a pocket 502. The shade 500, like the shade 10, includes a screen 504. To form the pocket 502, the shade is provided with a second layer 506 of material which overlies the first layer 504 of screening material. The second layer 506 of material is preferably as wide as the first layer of screening material 504, so that the two layers of material can be joined at their periphery. Additionally, the lower edge of the second layer 506 is joined to the lower edge of the first layer 504, to form a bottom of the pocket 502. Although the layer 506 is shown to have a height equal to the height of the layer 504, the second layer can have a height less than the height of the first layer, in which case, the pocket 502 will have a depth less than the height of the screen 504. Additionally, the second layer 506 can be mounted to the first layer 504, such that the bottom of the second layer (and hence the bottom of the pocket 502) are above the bottom of the first layer 504. A second pocketed shade 510 is shown in FIG. 23. The shade 510 is constructed similarly to the shade of FIG. 3 and is provided with a pocket in the same manner as discussed above in conjunction with the shade 500. The shade 510 is shown to be able to receive a plaque or sign 512. This sign 512 can simply be decorative. Alternatively, the sign 512 can contain a message, such as "Send Help". To facilitate insertion of the sign 512 into the pocket 514 of shade 510, the first and second layers 516 and 518 are preferably made from stretchable material. Further, the material from which the layers are made can stretch along two axes so that the material can be stretched in two opposing directions (i.e., widthwise and heightwise). Additionally, to enable the plaque 512 to be seen, the second layer 518 of material is preferable transparent or made from an open mesh.

Figure 24:
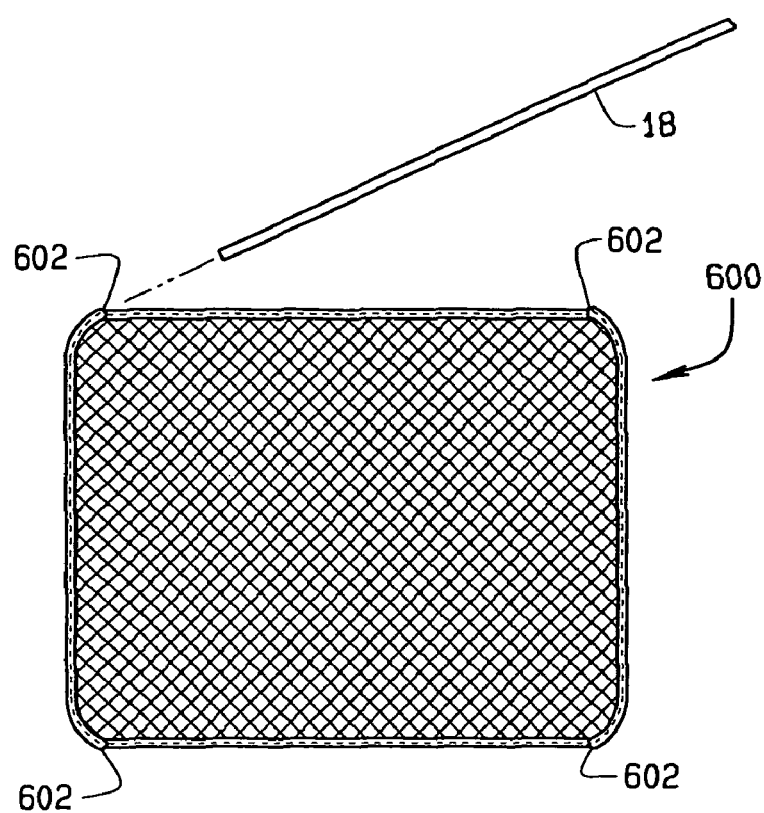
FIGS. 24 and 25 are plan views showing alternative manners of applying the compressible member to the shade.
Figure 25:
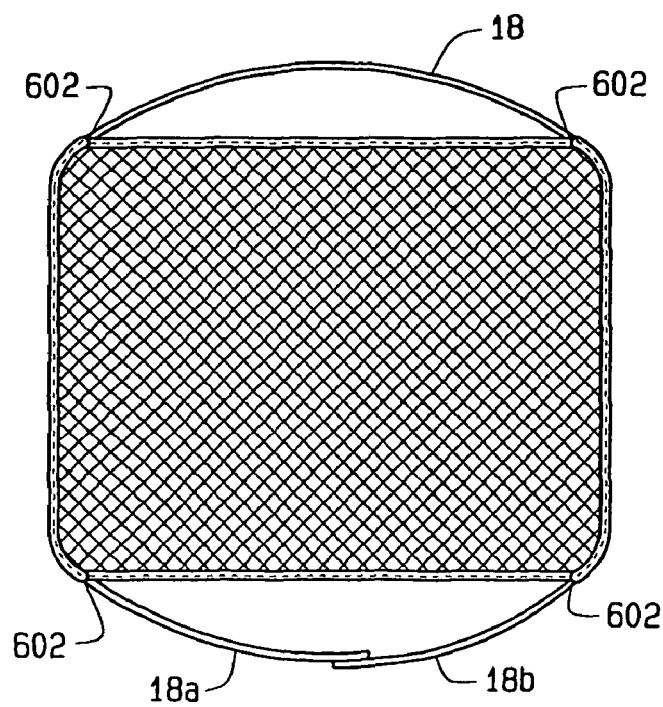

In FIGS. 24 and 25, a shade 600 is shown which is similar to the shade 10 of FIG. 3. However, in the shade 600, the perimeter of the screen forms pockets or openings 602, there being two opposed openings 602 along the top edge of the screen and two opposed openings 602 along the bottom edge of the screen. The compressible member 18 is then received in opposed openings 602, as shown in FIGS. 24 and 25. As seen in FIG. 24, the compressible member 18 can be formed from a single piece, in which case, the member 18 has a length greater than the length of the edge of the shade 600, such that the compressible member will bow or bend outwardly from the screen of the shade. As seen in FIG. 25, the compressible member can be comprised of a pair of shorter members 18a, b, which have a combined length greater than that of the edge of the shade. The ends of the two members 18a, b are then joined together by an appropriate connector.

Figure 26:
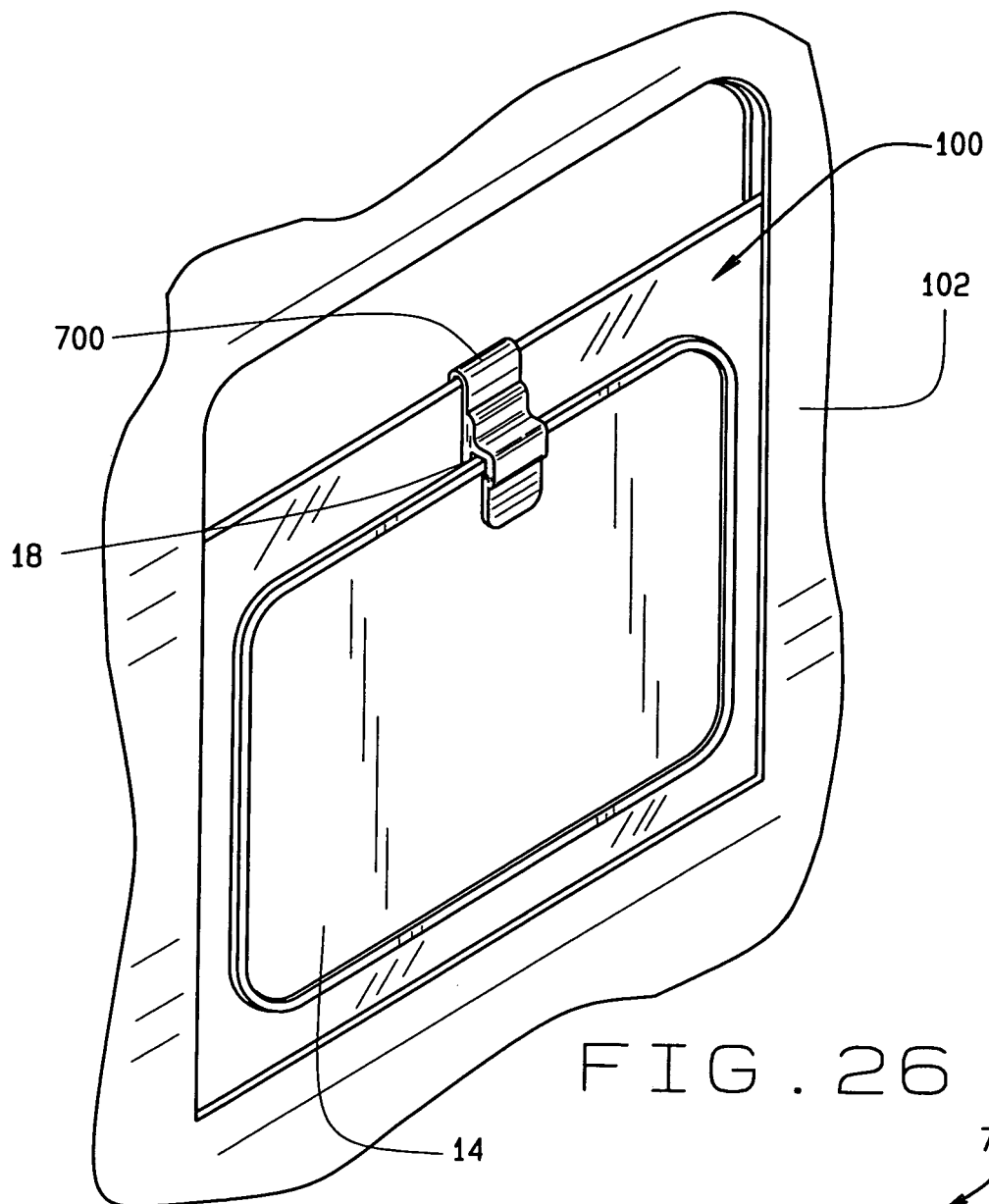
FIG. 26 is an isometric view of a window shade suspended upon an automobile window.

FIG. 26 begins the illustration of this embodiment of the present invention focusing upon suspending a window shade 14 from the upper edge of a window 100 in an automobile. A suspension means or clip 700 fits upon the upper edge and then descends upon the inside of the window 100 glass. The clip then grasps the compressible member 18 of a shade 14.

Figure 27:
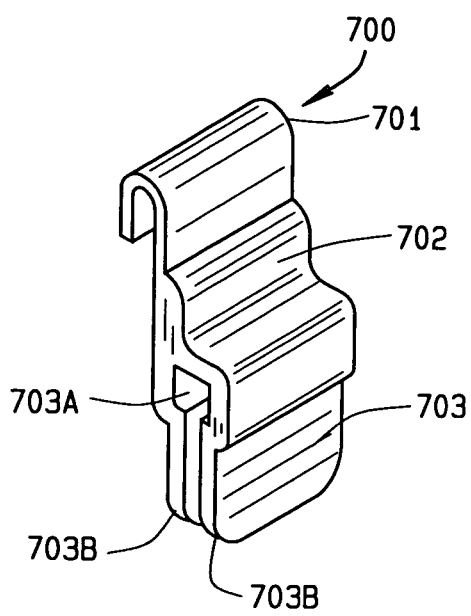
FIGS. 27 and 28 show a clip used to suspend the window shade by its frame.

A clip 700 appears generally in FIG. 27. The clip begins upon the upper end with a lip 701. The lip has a generally inverted U shape that extends for the width of the clip. Upon one branch of the lip, used upon the interior of a window, a body 702 joins to the lip. The body is generally thicker than the lip and also extends for the width of the clip. Below the body, a clamp 703 descends. The clamp has a shoulder 703a that joins to the body and two parallel spaced apart legs 703b that depend from the shoulder. The legs and shoulder cooperate to form a lateral opening through the clamp. The opening extends for the width of the clip and generally has the same shape as the cross section of the compressible member 18 in the shade 14.

Figure 28:
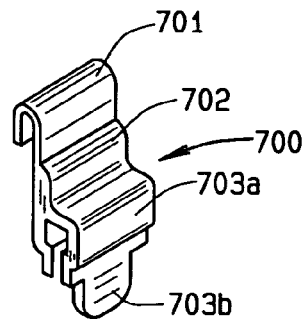

FIG. 28 shows an alternate embodiment of the clip 700, particularly in the clamp 703. In this embodiment, the clamp has two legs however, the interior leg 703b, that is closest to the interior of an automobile and generally opposite the lip, is longer than the other leg. The shoulder and legs still cooperate to provide an opening that receives the cross section of the compressible member.

Figure 29:
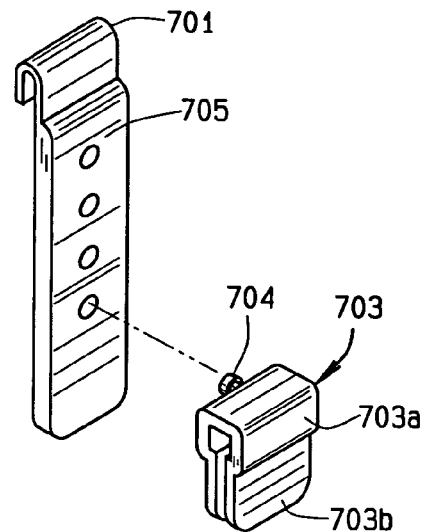
FIGS. 29 through 32 show a clip with a pin that engages a hole in a stem that allows for adjusting the elevation of a window shade.
Figure 30:
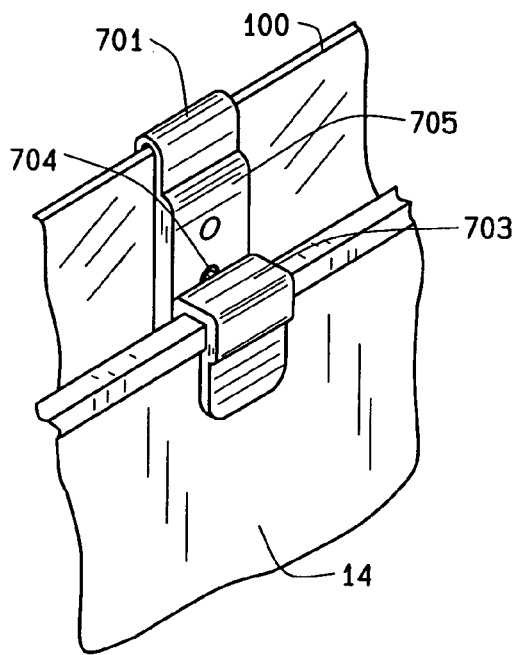

Then FIG. 29 shows another alternate embodiment of the clamp 703. In this embodiment, the clamp has a shoulder with depending legs as before but not a body and not a lip. The shoulder has a generally inverted U shape that extends for the width of the clamp. Above the legs upon one side, the exterior, as in closest to the window 100, the shoulder has a pin 704. The pin extends perpendicular to the shoulder and to the legs. Opposite the clamp, a stem 705 has a generally elongated shape, here shown as rectangular. The stem has a thickened portion with a pattern of holes upon the centerline. The holes extend through the stem. Opposite the thickened portion, the stem has a lip 701, generally an inverted U shape of thinner thickness than the remainder of the stem. The lip 701 fits over window 100 glass as then shown in FIG. 30. In use, the pin 704c is inserted into a selected hole while the lip is placed upon the upper edge of a window. By selecting a hole for the pin, the elevation of the window shade is adjusted by a motorist. As before, the opening formed by the shoulder and the legs admits the compressible member 18.

Figure 31:
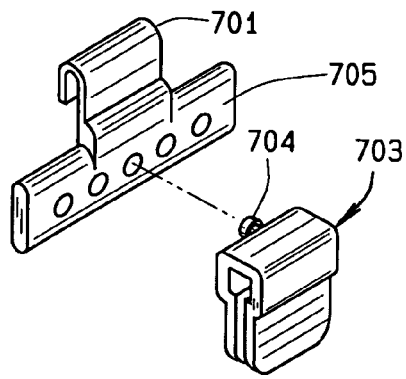
Figure 32:
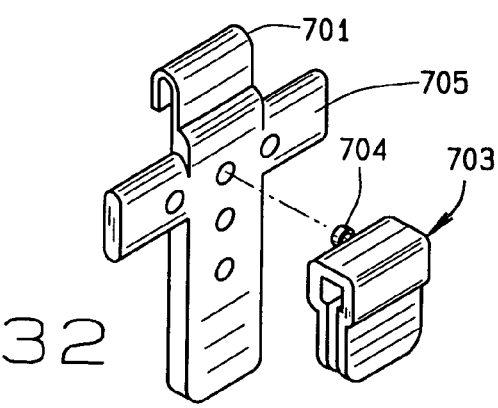
Figure 33:
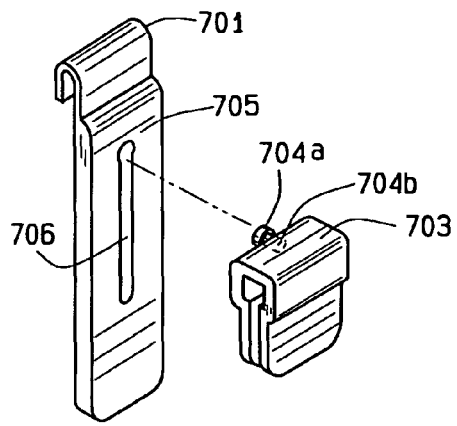
FIGS. 33 through 35 show a clip with a pin engaging a slotted connection of a stem.

FIG. 31 shows an alternate embodiment from the clamp of FIG. 29. In FIG. 31 the clamp has a perpendicular pin 704 as before while the stem is arranged perpendicular to the lip 701. The stem 705 has a pattern of holes that accept the pin. In this arrangement, the stem maintains a window shade at a constant height yet permits adjustment of the shade left to right upon a window. FIG. 32 shows another alternate embodiment of the stem with a cruciform shape. The stem has a pattern of holes upon a vertical portion and a horizontal portion. The stem in cooperation with the clamp permits adjustment of the window shade up and down and left to right upon a window. FIG. 33 shows another alternate embodiment for the stem. The stem here has an elongated slot 706 extending longitudinally upon the interior face of the stem. The slot has a widened end towards the lip that receives the head 704a of a pin. The remainder of the slot has a width similar to that of the diameter of the pin where the pin joins to the clip. In an alternate embodiment, the pin has a head upon a shaft 704b. The head has an oval shape where turning the clamp, so the legs are horizontal allows for insertion of the head into the slot and returning the clip so the legs are vertical secures, the clamp into the slot.

Figure 34:
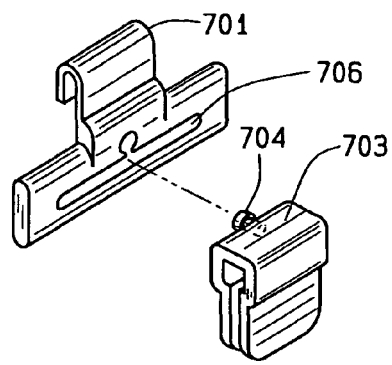

FIG. 34 continues the alternate embodiments of the stem. Here, the stem, similar to FIG. 31, has an arrangement generally horizontal with the stem perpendicular to the lip. The stem has a slot 706 generally lengthwise that receives the head 704a of a pin extending from the clamp. The slot has a widened circular opening centered and slightly above the slot. The circular opening receives the head 704a of a pin and permits the clamp to slide downwards into the narrower slot.

Figure 35:
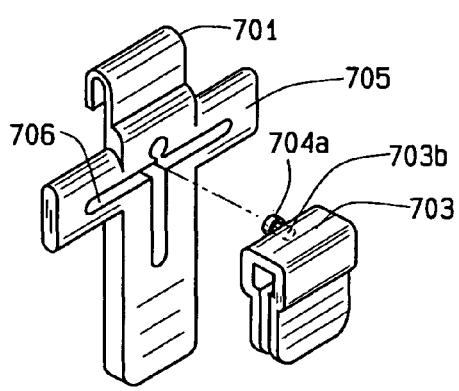

The slot has the same width as the shaft of the pin. The slot allows the clip carrying the window shade to slide left to right. FIG. 35 has a cruciform shape similar to FIG. 32 but having slots 706 upon the horizontal and vertical portions of the stem 705. The slot upon the vertical portion has a centered and slightly higher circular opening to admit the head 704a of a pin. The slot then has a width similar to the diameter of the shaft 704b of a pin. The slots permit the clip to adjust the position of the window shade vertically and horizontally.

Figure 36:
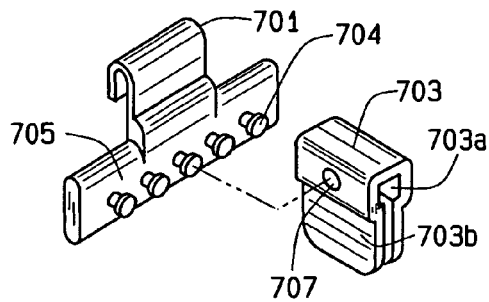
FIGS. 36 through 38 show a clip with a centered hole engaging a pin upon a stem that permits adjusting the elevation of a window shade.
Figure 37:
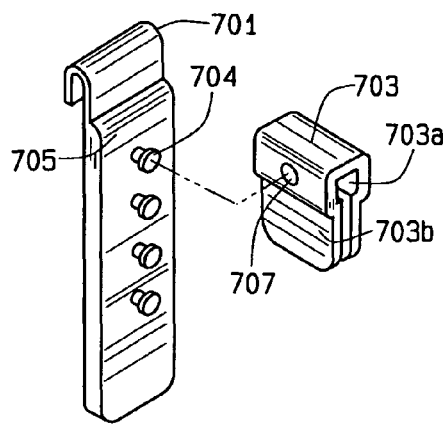
Figure 38:
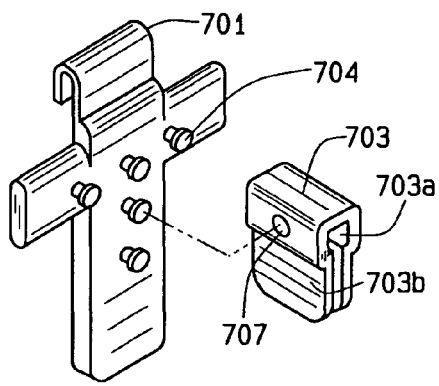

Viewing the connection of clip to stem differently, FIG. 36 shows a clamp 703 having a shoulder 703a and two depending spaced apart legs 703b. Upon the shoulder on one side of the clamp, a hole 707 receives the head 704a of a pin. The pin, as part of a plurality upon the stem, temporarily connects he clamp to the stem. Here, the stem 705 is generally horizontal and perpendicular to the lip. The stem has pins positioned along its length and extending outwards from the stem and located generally opposite the lip. The pins 704 are spaced apart to admit the width of the clamp between adjacent pins. This spacing permits the clamp to abut the stem. FIG. 37 shows an alternate embodiment of the stem 705 extending vertically below the lip. The stem here has a plurality of pins 704 spaced along its length and generally below the lip. The clamp has a hole 707 upon one side that receives the head of a pin. Here, the pins are spaced vertically to allow at least the shoulder of a clamp, if not the entire clamp, to fit between adjacent pins. A clamp with one leg shorter than the other as first described in FIG. 28 also works well in this embodiment. Then FIG. 38 shows a stem 705 with a cruciform shape and pins upon the horizontal and vertical portions of the stem. Adjacent pins 704 are spaced apart so that the clamp abuts the stem.

The clamp itself appears differently in FIG. 39. FIG. 39 shows another alternate embodiment of the clamp. The clamp has a shoulder and depending legs however, upon one side of the shoulder a rectangular band 708 extends outward. The band has its longitudinal axis parallel to the width of the clamp. The band provides a hollow space outside of the clamp. The stem 705 previously introduced in FIG. 29 fits inside the band and snugly occupies the hollow space. The stem has a lip 701 with a thickened straight portion descending below the lip.

FIG. 40 provides an alternate embodiment of the stem 705 that cooperates with the clamp 703 having a pin 704. Here the stem has a generally narrow rectangular shape with a suction cup 709 joined to one end and a plurality of spaced holes along the length of the stem. The suction cup connects with the glass of the window as the stem receives a pin from a clamp as earlier shown in FIG. 29. The suction cup allows positioning of a window shade generally while the holes upon the stem allow more precise adjustment of the window shade as the motorist desires.

FIG. 41 illustrates another embodiment of the stem and the clamp. The stem has a lip upon one end. The lip has an inverted U shape of two branches with the remainder of the stem attaching to the interior branch. Beneath the lip, the stem has a cylindrical form with a smooth surface 705a partially along its length. After generally three diameters, the stem has an undulating surface 705b. There the stem has an inner diameter less than the diameter beneath the lip and an outer diameter similar to the diameter beneath the lip. The undulating surface extends around the circumference of the stem and for a length in excess of ten diameters. Opposite the lip, the stem ends in a slightly tapered foot 705c that begins with a diameter similar to that beneath the lip and then narrows away from the undulating surface. The foot has a generally cylindrical form with a smooth surface.

In this embodiment, the stem has an undulating surface that cooperates with a clamp 703. The clamp has a shoulder 703a with two depending legs 703b. The legs and shoulder cooperate to provide an opening to receive the cross section of the compressible member. From the shoulder extending perpendicular to the legs, the clamp has a tab 710. The tab extends outwards at least the length of the shoulder. Generally centered upon the tab, an aperture 711 extends through the thickness of the tab and admits the undulating portion of the stem. The aperture has a generally round shape that has a slight concavity. The concavity matches the inner and outer diameters present in the undulating section of the stem.

Additional embodiments of the clamp, particularly the tab and aperture are shown in FIGS. 42, 43, and 44. FIG. 42 shows the clamp but with the tab having a convex shaped aperture. FIG. 43 has a different version of the tab with a vertical notch 712 through the tab into the aperture. The slot permits the tab to flex during insertion of the stem. Here in FIG. 43, the aperture retains a concave shape. Then in FIG. 44, the notched tab has an aperture with a convex shape.

Figure 45:
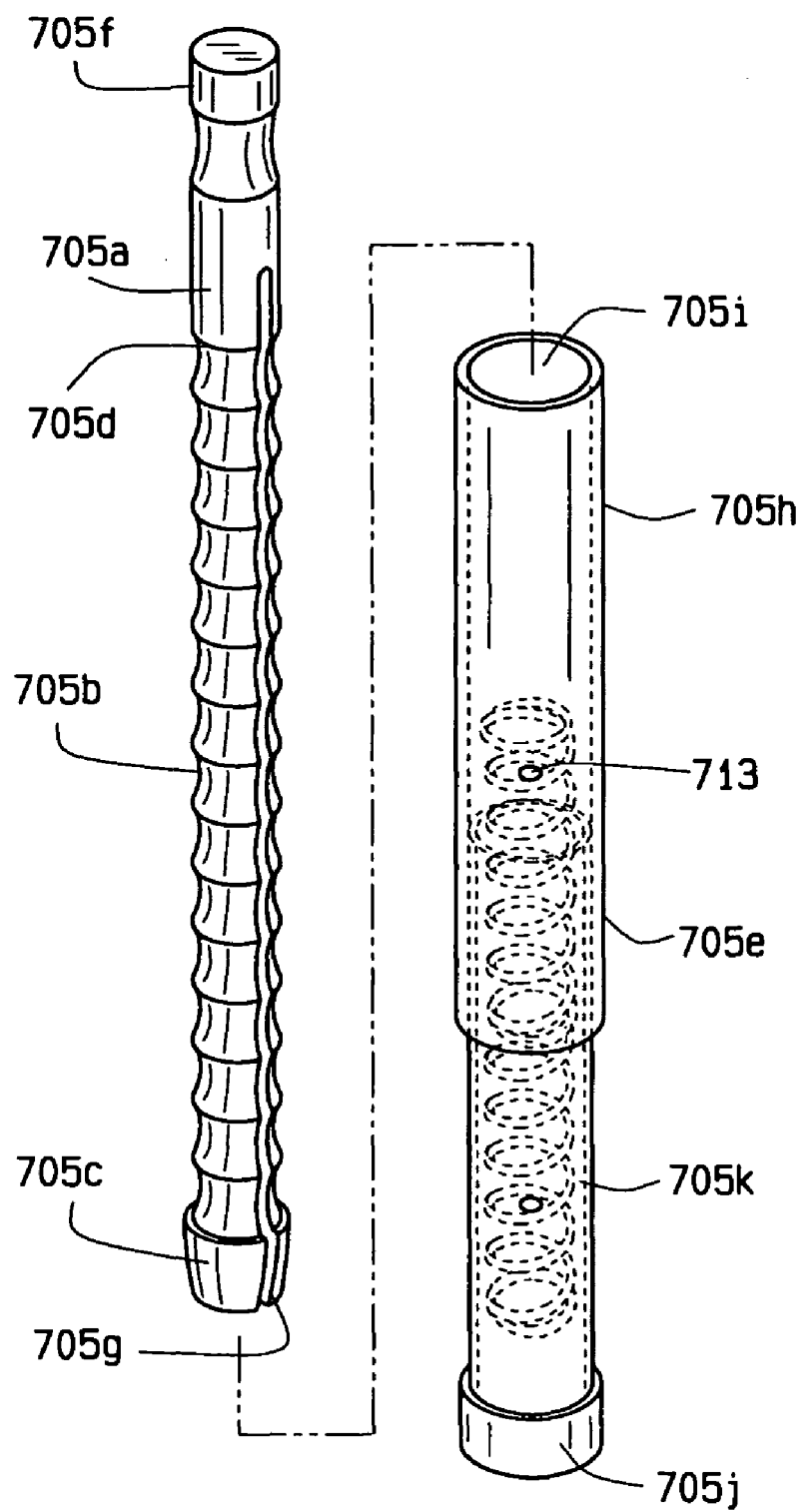
FIG. 45 describes the assembly of the spring loaded stem and FIG. 46 shows the spring loaded stem in use with a window shade.

FIG. 45 shows an additional embodiment of the stem based upon FIG. 41. Here the stem has two sections, upper 705d and lower 705e. The upper section resembles the stem of FIG. 41. One end 705f of the stem has a round cylindrical form with a flat top. The stem continues below with a smooth surface cylindrical form 705a for at least three diameters. Below the smooth surface, the upper section has a divided undulating portion 705b. As before, the undulating portion has an inner diameter less than the diameter of the end and an outer diameter similar to the diameter of the end. The undulating section has an end in a foot 705c located opposite the flat top 705f. However, the foot and undulating section have a longitudinal or vertical groove 705g extending partially along the diameter. The groove permits the undulating section and foot to slightly narrow their widths when inserted into the lower section 705e of the stem.

The lower section of the stem has a hollow receiver 705h. The receiver has an open end 705i of generally similar diameter to the larger diameter of the foot. Opposite the open end, the received has an end 705j with a flat bottom. The flat bottom is at the base of a hollow casing 705k. The casing has a slightly narrower diameter than the receiver. The casing secures a spring 713 contained therein. When relaxed, the spring extends through the length of the casing, generally upwards as shown in FIG. 45. The receiver 705h passes over the spring and along the outside of the casing 705k. The receiver joins to the casing yet extends above the relaxed length of the spring.

Figure 46:
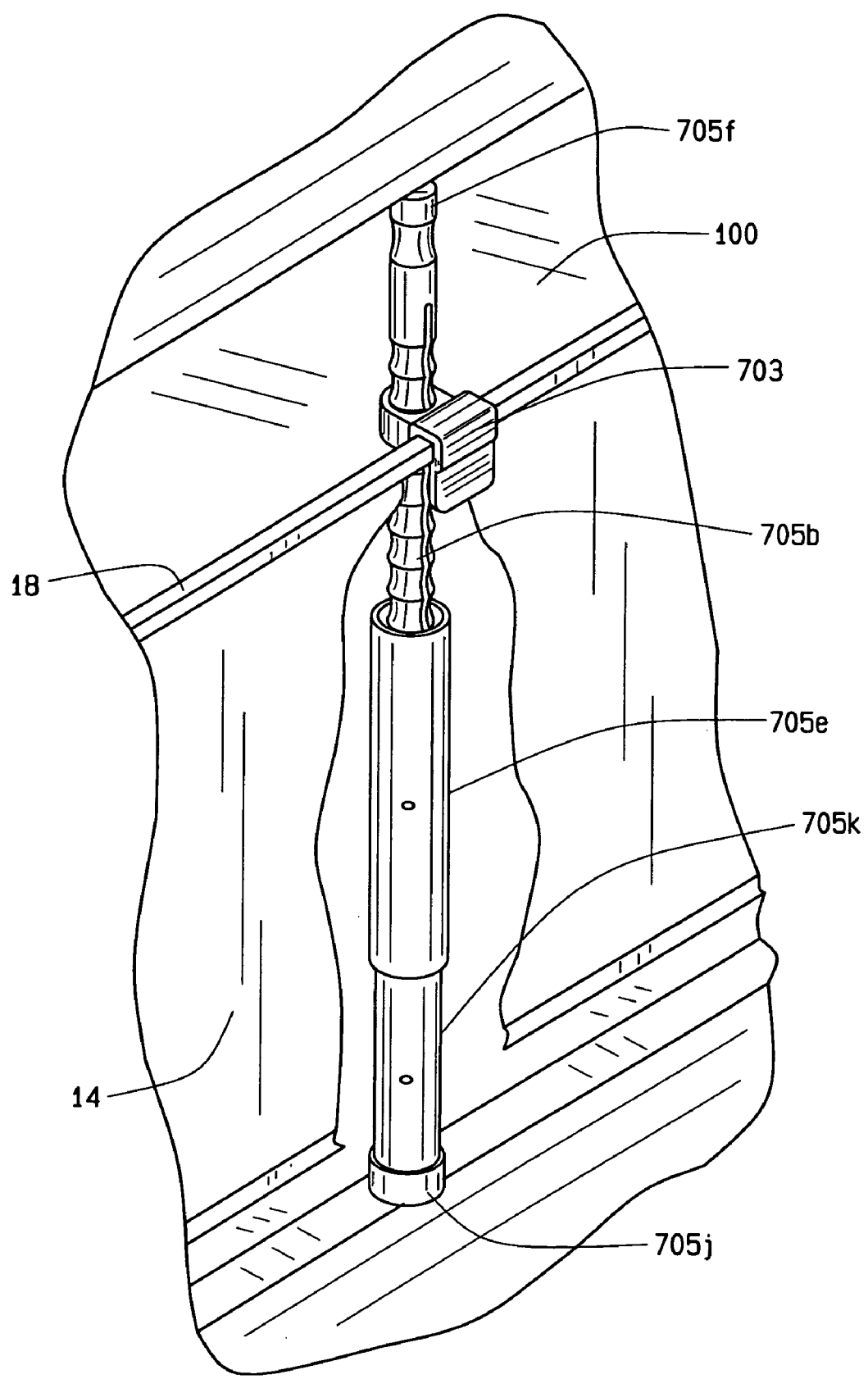

In use as shown in FIG. 46, the flat top of the end 705f is inserted through an aperture 711 of a clamp 703 upon the compressible member 18 of a window shade 14. The undulating surface 705b of the upper portion is then inserted into a receiver 705h of the lower portion of the stem. The foot of the undulating surface, after inserting into the open end of the receiver, is pressed against the spring 713. The length of the stem is then reduced slightly to allow for positioning of a window shade. Once a motorists positions a window shade, the flat top 705f of the upper section and the flat bottom 705j of the lower section are pressed against the frame of a window while the undulating surface 705b is pulled slightly outwards from the lower section. The action of the spring press fits the stem within a window frame 102 and thus supports a window shade 14 in a desired location without placing a clip, clamp, or lip 701 upon the edge of a window. With this additional embodiment, a motorist need not open a window to emplace a clamp or clip to secure a window shade.

Figure 47:
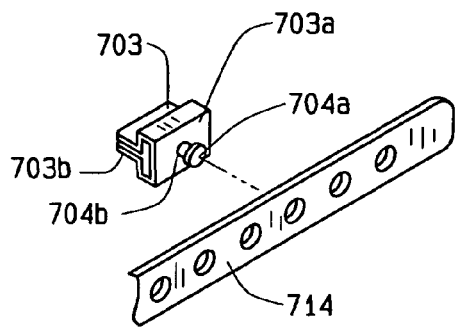
FIGS. 47 through 49 describe clips that connect with straps to form resilient members that position a window shade within a frame of a car.

The prior figures have described window shades suspended from stems upon clips. Window shades also install within the frame 102 of a car door, windshield, or rear window. Installed in a frame 102, the window shade attains its full planar form by the action of the compressible member 18. The compressible member stretches the window shade to the dimensions of its fabric or other material construction. Previously, the compressible member was positioned itself abutting the frame 102. FIG. 47 begins the description of a window shade suspended within a frame upon at least two exterior resilient members 714 pinned to the compressible member later shown in FIG. 48. FIG. 47 shows a clamp having a shoulder with two parallel depending legs. The legs and shoulder cooperate to have an opening of a cross section similar to that of a compressible member. In this embodiment, the clamp 703 has a pin 704 centered upon the shoulder 703a and extending perpendicular to the shoulder and opposite from the legs 703b. The pin has a head 704a upon a shaft 704b of a lesser diameter. The pin inserts into a hole in a resilient member. The resilient member 714, generally linear in shape, has two opposite ends upon a slender form and each end is provided with a series of spaced apart holes. The holes permit adjusting the resilient member so the bend or deflection of the resilient member temporarily secures a window shade within a frame.

Figure 48:
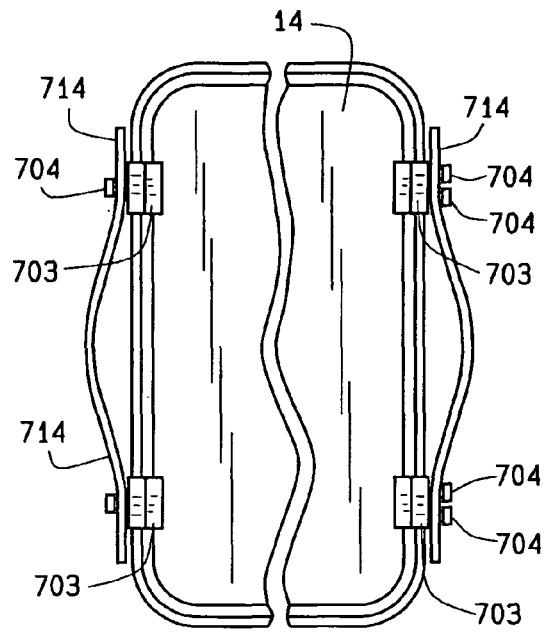

FIG. 48 shows a window shade 14 with a compressible member 18 opening the shade fully. This figure has a generally rectangular shade calling for two resilient members 714 to secure the shade into a frame 102. Each resilient member has two ends with each end connected to a clamp 703 in a pinned connection using the clamp of FIG. 47. The clamp fits upon the compressible member and receives an end of a resilient member upon the pin.

Figure 49:
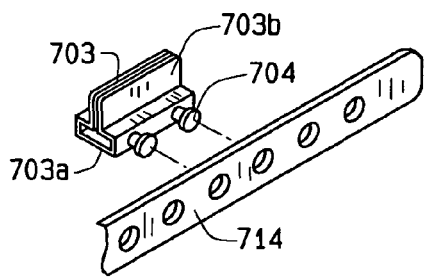

FIG. 49 shows an alternate embodiment to the clamp of FIG. 47. In this embodiment, the clamp has a shoulder 703a and two depending legs 703b. However, two pins 704 are located upon the side of the shoulder generally perpendicular to the legs. The spaced apart legs and hollow shoulder cooperate to admit a compressible member. The two pins each have a head 704a upon a shaft 704b of lesser diameter. The two pins then insert into adjacent holes in an end of a resilient member 714. The clamp and resilient member are positioned similar to the resilient members shown in FIG. 48.

Figure 50:
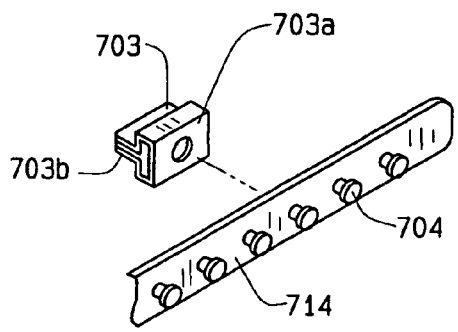
FIGS. 50 and 51 show a releasable clip that allows adjustment of the resilient member length.
Figure 51:
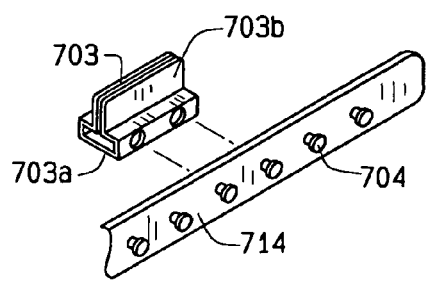

FIGS. 50 and 51 show alternate embodiments of FIGS. 47 and 48 respectively. FIG. 50 shows a connecting means or clamp 703 with a round hole centered in the shoulder. The round hole admits the head 704a of a pin extending from an end of a resilient member 714. Each end of the resilient member has a plurality of spaced pins 704 that permit adjusting the bend or deflection of the resilient member. FIG. 51 shows a clamp with two round holes centered upon the side of the shoulder. The holes admit the heads of two pins generally perpendicular to the legs 703b of the clamp. As before, each end of the resilient member has a plurality of spaced pins for a firm connection of the resilient member to the clamp.

Another embodiment of connecting a resilient member to the compressible member of a window shade appears in FIGS. 52, 53A, 53B, 53C, and 53D. Here, the compressible member has a cross section with at least one flat edge as in L shape or T shape. A closer 715 joined to a resilient member releasably grasps a flat edge of the compressible member. The closer has a forward portion with a generally U shaped cross section. The U shaped cross section has an interior branch and an exterior branch mutually parallel and spaced apart shown in FIG. 53A. The interior branch is accessible from the inside of an automobile. The interior branch is generally longer than the exterior branch. The interior branch has a plurality of parallel ridges 716 extending longitudinally and generally centered. Between the ribs and the end of the interior branch, opposite the resilient member, the interior branch has a hole for a pivot 717. Opposite the interior branch, the exterior branch extends parallel to the resilient member. The exterior branch has a plurality of teeth 718, shown in FIG. 53B, generally opposite the pivot and towards the resilient member. The teeth permit the exterior branch to grip the material of the window shade.

Figure 53C:
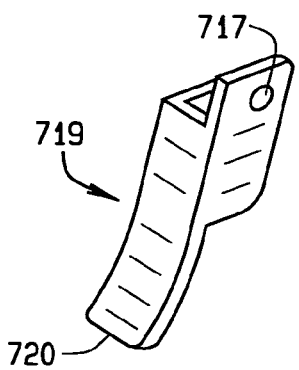
Figure 53D:
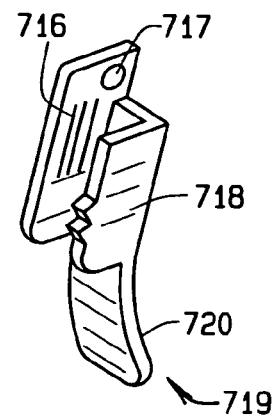

The pivot connects the handle 719 to the closer and the handle operates generally from the inside of an automobile. The handle has a tab 720 for grasping by a motorist's fingers. Ahead of the tab in FIG. 53C, the handle has a generally U shaped cross section similar to the closer with interior and exterior branches. The exterior branch, as shown in FIG. 53D has a plurality of parallel ridges 716 slightly behind a hole for the pivot 717. The ridges of the handle engage the ridges of the closer to provide a temporary securement of the handle to the closer. The interior branch of the handle also has teeth 718 for grasping the fabric of a window shade.

Figure 54:
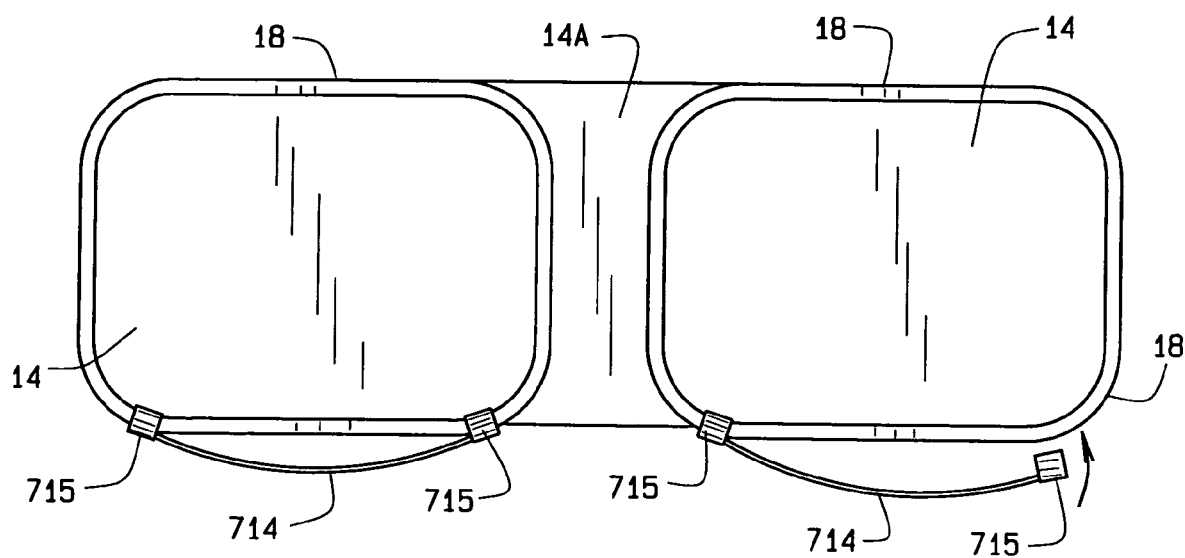
FIG. 54 shows the resilient members upon adjacent window shades for use in the front windshield of a car.

In use, a resilient member 714 having the closer 715 with handle 719 connects to a compressible member 18. A motorist opens the handle 719 away from the closer by turning the handle upon the pivot 717. The motorist then places an edge of the compressible member 18 into the U shaped section of the closer 715 with the ridges 716 of the closer towards the outside of the compressible member. The motorist then rotates the handle 719 upon the closer 715 securing the compressible member between the handle and the closer. The handle secures to the closer as the ridges 716 engage one another. This usage is shown in FIG. 54 where a pair of window shades 14 are joined by a fabric center panel 14a and each shade has a resilient member 714 secured upon each end by a closer 715 upon a compressible member 18.

Another embodiment of the clip appears in use in FIG. 55. A window shade 14 has a compressible member 18 upon the perimeter. The compressible member has at least one flat surface, here shown perpendicular to the plane of the window shade. The compressible member is similar to a resilient band that stretches the window shade to its full planar extent, here shown as rectangular. A clip 700 grasps the compressible member 18 over any covering. The clip has members that grasp the two spaced apart edges of the compressible member so that the clip remains in place during usage, often on a vehicle window.

FIG. 56A shows the clip 700 in further detail. The clip has a depending lip 701 that is generally located outwards from the body 702 and temporarily secures to the inside of window glass during usage. The body is generally perpendicular to the clip and has a greater length than the width of the clip. The members that grasp the compressible member 18 are a plurality of alternating legs 703B. In this alternate embodiment, three legs 703B depend from the body 702. Each leg joins to the body by a shoulder 703A that is of less length than the leg 703B. The difference in length between the shoulder and the leg allows the leg to grasp one edge of the compressible member. The legs alternate their direction so that at least one leg grasps each of the edges of the compressible member. In this embodiment, the outer legs have a shoulder located towards the lip and the inner leg, here shown centered, has a shoulder located opposite the lip 701.

Looking at the side of the clip in FIG. 56B, the clip 700 has a lip 701 shown towards the left and the body 702 shown towards the right. The body has a generally rectangular cross section with the legs extending below from shoulders. In the foreground, an outer leg 703B appears with the shoulder 703A to the left. Beyond the end of the outer leg 703B, the shoulder of the inner leg 703B partially appears. The alternating position of adjacent legs places the shoulders away from the center of the body leaving a lengthwise space between the legs through which the compressible member passes.

FIG. 57 shows another alternate embodiment of the clip 700. As in FIG. 56A, the clip has a lip 701 depending upon one side and legs 703B depending from the body 702 opposite the lip. The body 702 though has an arcuate shape that has a midpoint and two ends located below the midpoint. The midpoint joins to the clip 700 so the body attains a generally convex appearance that matches a rounded corner upon a window shade. As before the legs 703B alternate, and the leg at the midpoint generally has its shoulder located away from the lip 701 thus containing the compressible member between the leg and the clip.

Figure 58:
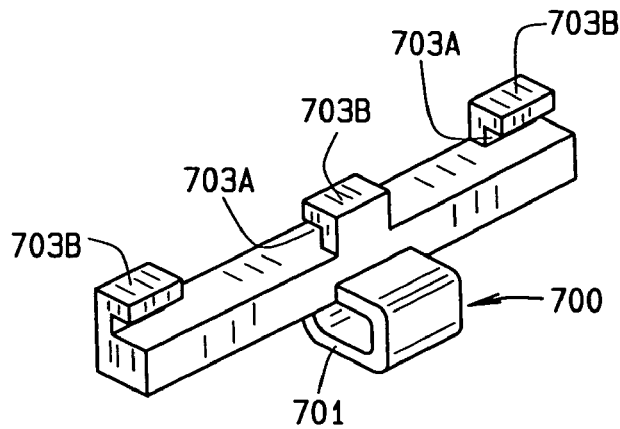
FIG. 58 is a top view of a clip for slideable engagement.

Another alternate embodiment of the clip 700 is shown in FIG. 58. This embodiment has lip 701 extending behind a body 702. The body has a generally rectangular shape of greater length than the width of the lip. The lip has a flat strip shape bent to grasp window glass. The legs 703B in this embodiment extend generally parallel to the lip. As before the legs alternate, but have the shoulders 703A joined to the body 702 opposite the lip. The legs in this embodiment are generally perpendicular to the clip as previously described in FIG. 56A. The legs extend inwards generally about half the height of the body. Each leg joins to a shoulder 703A that spaces the leg away from the body. The shoulder has less length than the leg to provide a gap for the compressible member that secures to the legs. The alternating arrangement of the legs allows the clip to remain upon the compressible member by the action of friction.

Figure 59:
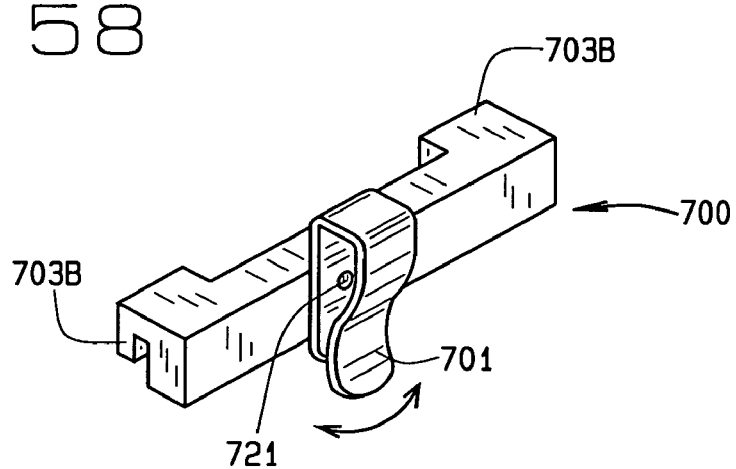
FIG. 59 is a top view of an alternate embodiment of the clip having a swivel feature.

Another alternate embodiment of the clip appears in FIG. 59. This clip has a lip 701 having a generally U shape with two branches. One branch has a pinned connection 721 to the body 702. The pinned connection allows the lip to rotate upon an axis perpendicular to the length of the body. The body 702 has a plurality of alternating legs 703B, here showing the two outer legs. The shoulders of the legs are again located towards the outside of the body, here shown as the top. The pinned connection allows the lip to remain upon the edge of window glass and yet the body can turn slightly as the shade is adjusted from time to time.

Figure 60:
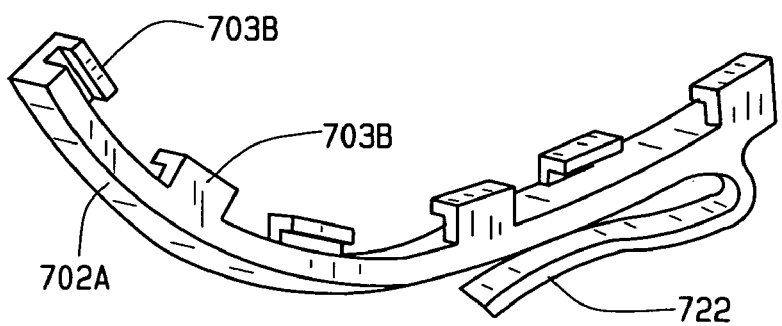
FIG. 60 is an isometric view of an extended clip for slideable engagement.

A further alternate embodiment takes form in FIG. 60 as a lengthened version of that shown in FIG. 56A. Here the clip has a body 702A generally rectangular in cross section and elongated. The body has an arcuate end and an opposite straight end. Upon the straight end, a clip 722 hangs below the bottom of the body and extends longitudinally. The clip approaches the body part way upon its length, for securing the clip within a window frame by the resilient action of the clip 722 as when grasping a compressible member. Opposite the clip, the body has a plurality of legs 703B. The legs extend for the length of the body in an alternating manner generally shown by the shoulders. The shoulders 703A spaced the legs 703B upwards from the body. The legs extend inwards slightly more than half the width of the body similar to that previously shown in FIG. 56B. The gaps between each leg and the body align so that a compressible member fits within the grasp of the legs. This alternate embodiment fits upon curved compressible members as when a window shade has a rectangular shape with rounded corners or a triangular shape with rounded corners.

Figure 61:
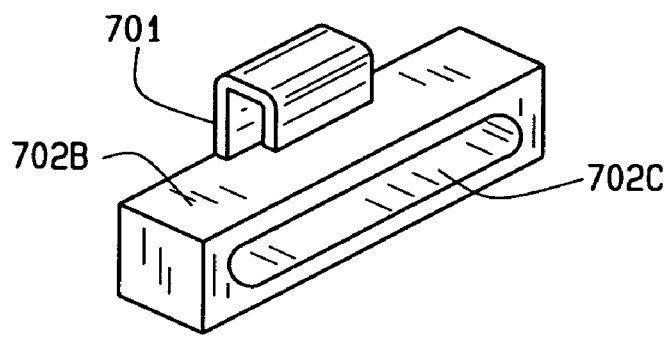
FIG. 61 is an alternate embodiment of the clip having a single slot for a strap.

A further alternate embodiment of the clip 700 is shown in FIG. 61. This clip has a lip 701 that extends downwards for securing the clip upon the edge of window glass. Opposite the lip, the clip has the body 702B that can receive a strap inserted therethrough. The body has a nearly lengthwise slot 702C that extends through the width of the body. The body retains sufficient residual thickness above and below the slot for rigidity.

Figure 62:
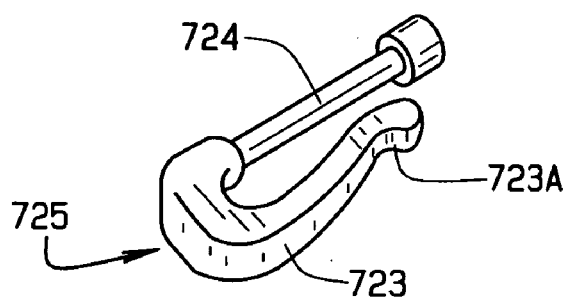
FIG. 62 is an alternate embodiment of the clip having two branches.
Figure 63:
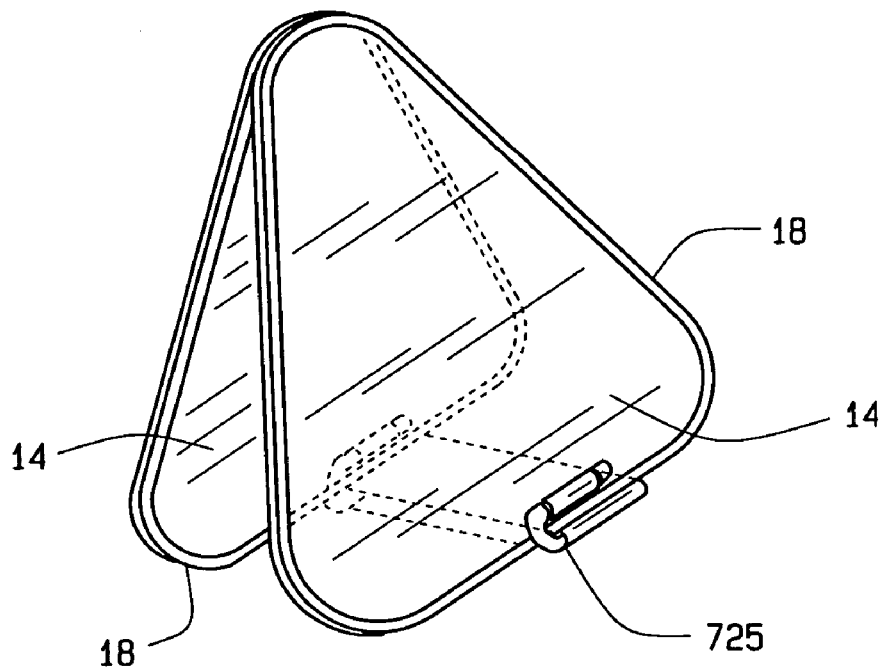
FIG. 63 shows this alternate embodiment in use.

And a further alternate embodiment of a clip, called a hook 725, takes form in FIG. 62. The hook has a generally U shape with a jaw 723 and a generally parallel pin 724. The jaw extends longitudinally and has a somewhat bent shape that approaches the coplanar pin. The jaw comes closest to the pin at the bight 723A. The jaw in this embodiment has a rectangular cross section. Meanwhile, opposite the jaw, the pin 724 extends parallel and coplanar to the jaw. The pin though has a generally round cross section of lesser diameter than the width of the jaw. The pin expands in diameter for a short distance opposite the junction with the jaw. As shown in FIG. 63, the pin 724 accepts a strap used to restrain a shade from expanding as the compressible member of the shade seeks its original shape. The jaw 723 has a sufficient gap from the pin 724 to grasp the edge of window glass or another flat edge of similar thickness.

Figure 64:
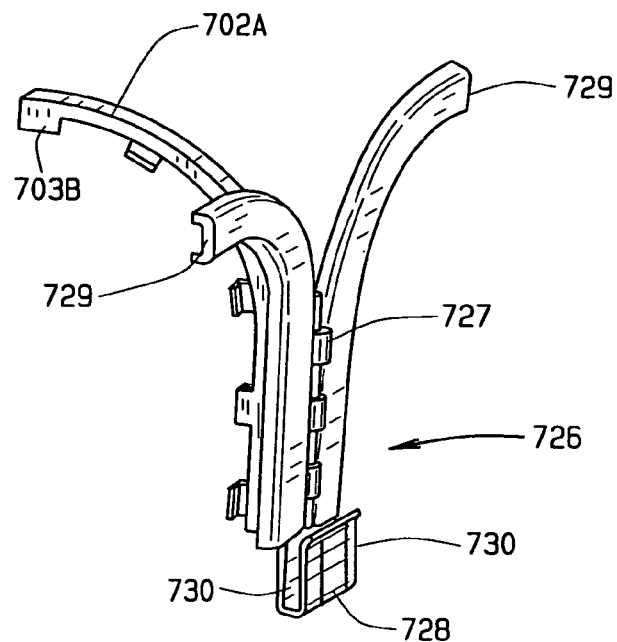
FIG. 64 is an alternate embodiment of the clip having hinged covers outside of the body.

FIG. 64 shows a further alternate embodiment of a clip, called a stand. The stand 726 has a body 702a similar to that of FIG. 60. The body has an arcuate shape, in a generally convex manner with a free end and an opposite upper end. Spaced along the body is a plurality of alternating legs 703b. The legs join to the body at shoulders and have a lip spaced apart and parallel to the body. Each lip is wider than a leg thus providing a passage between the lip and the body for the compressible member of a shade. Upon the upper end, the body has a plurality of spaced apart coaxial sockets 727 opposite the legs. The sockets align parallel to the longitudinal axis of the body. At the upper end, a hook 730 extends away from the body and generally has an inverted U shape. One branch of the U shape joins to the upper end. The sockets form a hinge with cooperating sockets upon at least one shell 729. Each shell 729 has an arcuate shape similar to that of the body, a free end, and an upper end opposite the free end. Each shell has a hollow cross section, preferably a U shape. Near the upper end, each shell has a plurality of spaced apart sockets 727 offset from the sockets of the body so that the sockets of the body and each shell mesh to form a hinge. The sockets of the body and of each shell have sockets that align coaxially and permit the shells to fold upon the body. The hollow portion of each shell closes upon the body and receives the legs. Extending from the upper end of each shell, a second hook 730 has a similar shape as the hook 728 upon the body. Here in FIG. 64, the stand 726 has two shells 729 unfolded from the body 702a with the second hooks adjacent to the hook, forming a continuous hook. The hook can be placed upon an edge of an automobile such as the top of a hood, edge of a hood, or an edge of a trunk. A stand secured by continuous hook holds a shade upright upon an automobile.

Figure 65:
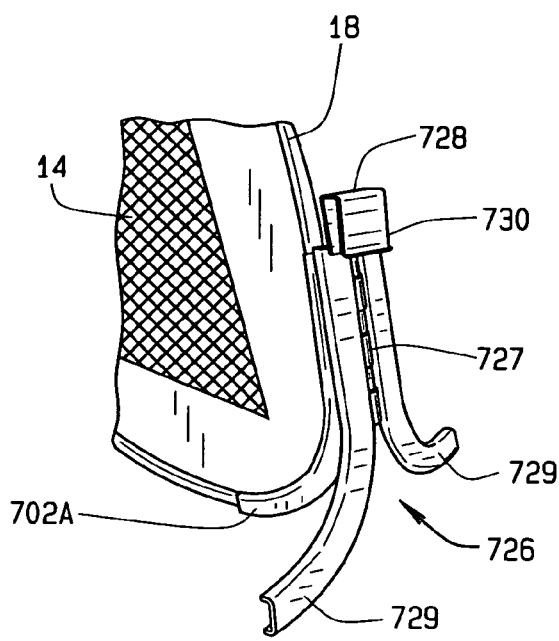
FIG. 65 shows the alternate embodiment installed upon a shade.

Inverting the stand shown in FIG. 64, a shade is connected to the body in FIG. 65. The compressible member 18 of the shade 14 slips through the gaps between the lips and the body 702a similar to the hook of FIG. 60. The free end of the body is generally placed upon the bottom of a shade while the upper end of the body is placed upon the compressible member but positioned above the free end. The shells 729 are opened outwards and away from the shade 14. The shells pivot upon the hinge formed by the enmeshed sockets 727 and provide three points of support with the free ends, thus the shade stands upright. When upright, the shade upon the stand 726 has the hook 728 and second hooks 730 located away from a corner of the shade along the compressible member. The hook and the second hooks abut and combine to form one member to grasp an edge of a vehicle such as a window edge or edge of a hood or trunk.

Figure 66:
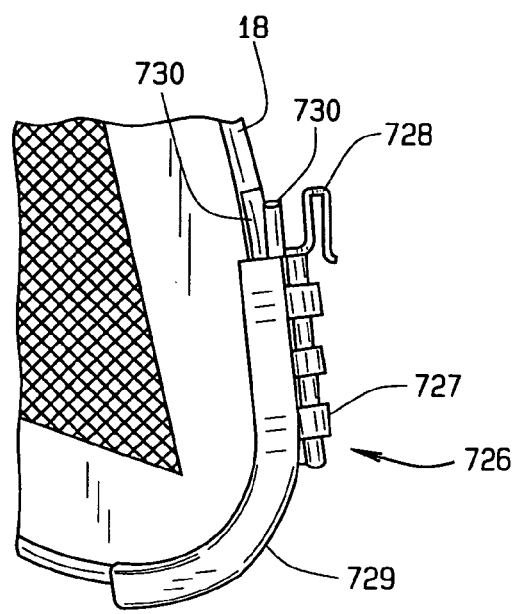
FIG. 66 shows the alternate embodiment with the covers closed upon the body at the corner of a shade.

FIG. 66 then shows the shells 729 folding upon the body when the shade is to be moved or no longer to stand by itself. The shells pivot inwards upon the sockets 727 and come to rest upon the body and the compressible member. In folding, the second hooks turn away from the hook and generally flank the compressible member as each shell approaches the body. The hook remains at one end of the sockets and away from the compressible member. When folded, the shells present a generally flush stand 726 collapsed upon a corner of the compressible member for compact storage.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. A shade for use within a vehicle and for application upon its window comprising:

said shade having at least one closed edge defining a continuous perimeter boundary;

at least one compressible member stiffening said closed edge of the shade and being contiguous with said perimeter boundary;

means to suspend said shade adjacent to a window within a vehicle, said suspension means temporarily grips said compressible member and said shade and the remainder of said shade hangs from said suspension means;

said suspension means having a clip, said clip having a lip, generally of an inverted U shape, so that the U shape lip can fit over the upper edge of the vehicle window when installed, a body joined to said lip of the clip, and a clamp beneath said body and opposite said lip;

said clamp having a shoulder formed therein and joining said body, a pair of mutually parallel and spaced apart legs extending downwardly from said shoulder, said shoulder have an opening formed therein and being of a shape to accommodate the shape of the compressible member of said shade, there being a spaced between said legs to accommodate the location of the shade therein extending downwardly from said compressible member; and whereby said shade and its compressible member being suspended by said clip upon the upper edge of the automobile window when applied during usage.

* * * * *